(12) United States Patent
Light

(10) Patent No.: US 6,480,835 B1
(45) Date of Patent: Nov. 12, 2002

(54) METHOD AND SYSTEM FOR SEARCHING ON INTEGRATED METADATA

(75) Inventor: John Light, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,520

(22) Filed: Dec. 31, 1998

(51) Int. Cl.$^7$ .............................................. G06F 17/30
(52) U.S. Cl. ............................................... 707/3; 707/5
(58) Field of Search .............................. 707/1, 2, 3, 4, 707/5, 101, 104, 501; 709/201, 221; 704/270.1; 345/356

(56) References Cited

U.S. PATENT DOCUMENTS

| | | | | |
|---|---|---|---|---|
| 5,594,792 A | * | 1/1997 | Chouraki et al. | 709/201 |
| 5,596,744 A | * | 1/1997 | Dao et al. | 707/10 |
| 5,737,734 A | * | 4/1998 | Schultz | 704/270.1 |
| 5,774,888 A | | 6/1998 | Light | 707/1 |
| 5,778,363 A | * | 7/1998 | Light | 707/5 |
| 5,842,217 A | | 11/1998 | Light | 707/101 |
| 5,873,076 A | * | 2/1999 | Barr et al. | 707/3 |
| 5,991,756 A | * | 11/1999 | Wu | 707/3 |
| 6,014,662 A | * | 1/2000 | Moran et al. | 707/3 |
| 6,038,560 A | * | 3/2000 | Wical | 707/5 |
| 6,154,213 A | * | 11/2000 | Rennison et al. | 345/356 |
| 6,170,011 B1 | * | 1/2001 | MacLeod Beck et al. | 709/221 |

OTHER PUBLICATIONS

Manber et al., "GLIMPSE: A Tool to Search Through Entire File Systems," *University Of Arizona, Dept. Of Computer Science*, TR 93–34, Oct. 1993, pp. 1–10.

Light, "Distributed, Graphical, topic–oriented Document Search System," *Sixth Int'l Conference on Information And Knowledge Management*, Las Vegas, NV, Nov. 10–14, 1997.

* cited by examiner

*Primary Examiner*—Diane D. Mizrahi
(74) *Attorney, Agent, or Firm*—Kenyon & Kenyon

(57) ABSTRACT

A method and system are disclosed for searching a set of documents using compact integrated metadata. Each document comprises a set of terms. The metadata comprises a set of topic profiles, each topic profile defining a relationship between a topic and the documents, a set of distinguishing terms for searching the documents by their component terms, and a set of document surrogates for allowing the documents to be searched by topic or by term. The method and system create references from each topic profile to document surrogates relevant to the corresponding topic, and create a set of references from each distinguishing term to document surrogates containing that term. The method and system accept a query and search on the documents using the metadata. The method and system provide the ability to filter the metadata before presentation to the user and to integrate searching on a client processor with searching on a server processor. The method and system provide the ability to maintain a set of search states, each search state describing a subset of the documents to be searched, and a set of filters, which are the queries which resulted in the subset of documents.

35 Claims, 15 Drawing Sheets

LIST OF DISTINGUISHING TERMS 30

| |
|---|
| 31 |
| 32 |
| 33 |
| 34 |
| • • • |
| 35 |

FIG. 2

LIST OF COMMON TERMS

| |
|---|
| 21 |
| 22 |
| 23 |
| 24 |
| ⋮ |
| 25 |

20

|  | TOPIC PROFILE 60 |  |  |
|---|---|---|---|
| 70 — | BICYCLING | | TOPIC NAME |
| 72 — | A RECREATIONAL ACTIVITY USING TWO WHEELED... | | TOPIC SUMMARY |
| 80 — | PEDAL | .7 | — 85 |
| 81 — | SPOKE | .8 | — 86 |
| 82 — | TEN SPEED | 1 | — 87 |
|  | • • • | | |
| 83 — | BIKE | 1 | — 88 |
|  | PROFILE TERMS | PROFILE WEIGHTS | |

FIG. 5

METHOD AND SYSTEM FOR SEARCHING ON INTEGRATED METADATA

BACKGROUND OF THE INVENTION

1. Field of the Invention

The present invention relates to the field of computer systems. More specifically, the present invention relates to information retrieval (IR) technology, in particular to searching over multiple filtering criteria such as both text and topic criteria.

2. Background Information

Modern computer technology allows databases to incorporate ever greater amounts of information. In order to take full advantage of these advances, methods must be developed to allow a user to quickly, easily and inexpensively identify, retrieve, and order information in a database. Effective IR requires that the search be inexpensive and accessible and that the query results be presented in a manner that facilitates searching.

Conventional IR methods for text based documents rely on large, detailed representations of document sets. Documents are represented by an index file that is derived from the terms of the documents through tokenization, stopping, stemming, elimination of capitalization, and inversion. In stopping, common words are eliminated from the document token stream. Tokens which are to be stopped are the most common words in a given language, such as "a" and "the." Stemming strips tokens of certain suffixes such as "ing", "ation" and indications of plurality. Thus "Work", "working" and "works" are represented as "work." Each term in such a full text index ("FTI") serves as an index to the documents in which it appears.

A user searches FTIs by creating term-based queries for documents that include specified keywords. The searches may include term position information. Some methods return all documents containing the specified terms and which have fit the specified term location criteria. Other methods calculate a similarity function between the terms in a query and the terms in each document. Such methods may include a document in a search result as being relevant, even if the document does not fit all the query criteria, as long as the similarity value is greater than a threshold.

Certain FTIs preserve information on the location of terms within documents. This allows users to specify adjacency criteria when searching the document set; i.e., to specify that documents matching a query include instances of terms which are adjacent or are in the same sentence, for example.

Such FTI methods require large amounts of storage space. Despite the use of stemming and stopping, virtually every word in the document set must be represented in the index with information on the location of each occurrence of the term in each document in the document set. An FTI may be 50–300% of the size of the document set itself. Generation and maintenance of an index often requires dedicated computers having processing and storage capacities whose cost is beyond the reach both of those maintaining and those accessing the database. Such indexed document sets are typically available only through services, such as Lexis®/Nexis® and Dialog®, and the available indexes are limited to those document sets for which the costs can be justified.

Because such indexes are costly to generate and take up a large amount of storage space, searching on these indexes is typically performed at a site remote to the user but near the document set. This is because the transmission of the indexes to a user and their storage by a user is impractical. In addition, some FTIs contain enough information to reconstruct the original document set, which may be proprietary. Search performance is dependent on data transmission performance and by the availability and workload of remote processors.

Conventional IR methods have limitations in addition to their resource requirements. By the use of stopping, stemming and elimination of capitalization, these methods eliminate information useful to searching. This information is eliminated in order to genericize terms entered as queries and to lower the storage costs of the indexes. While these methods allow for searching based on phrases comprising more than one token, these phrases may not include information eliminated by stopping, stemming and elimination of capitalization.

Conventional IR methods often require a user to enter an exact representation of a phrase and all its variants (i.e. synonyms) in each search query. This is time consuming for the user, and since a user will typically not have the time to contemplate the existence of such variants, documents containing variants of a phrase may not be found. Furthermore, due to the loss of information as a result of stopping, stemming and capitalization elimination, compound terms (i.e. phrases) are not able to be fully defined. Few conventional IR methods allow a definition of a compound term or of the variants of a term to be created prior to indexing using that term. For example, conventional IR methods will not allow for the equivalence of "Federal Bureau of Investigation", "FBI" and "Federal Bureau" to be defined before indexing.

Conventional IR methods conduct searching over the text of a document set, using combinations of terms as queries. Conventional IR methods allow for searching and categorization by topic (an area of subject matter or any other categorization); however such methods require that the topics be defined after the documents are indexed.

Some search methods include pre-defined topic definitions as well as term specifications. However, such relevancy determinations typically contain terms which are added to a text search query, where the terms are selected to gather documents relevant to the topic. The topic itself is not evaluated relative to the documents.

Because of the resource requirements of conventional IR methods, and because of their limitations when using topics, it is difficult to integrate these methods with graphical searching and graphical query result representation.

Current IR methods do not easily allow for a document index to be filtered prior to use. Thus the full index must usually be accessed by a user, who may be interested in only a small part of the index, and who may not wish to support the resource requirements of the full index.

Current search methods do not allow a user to search using different processors having different capabilities, or to store the state of a search for later use. When a user searches using conventional methods, the search domain—the set of documents over which the user searches (or the set of references to these documents)—is not adjustable at the client level. In an effort to adjust the number of documents returned and narrow a search over a series of iterations, the user often enters an entirely new search for every iteration, replicating information from a previous search. Storing the state of a user search (for example, a set of documents to be searched) eliminates this problem. While current commercial search engines allow for a search state to be maintained, this state is maintained at the server processor, which must devote large amounts of storage resources to maintain process states for the numerous users serviced by the server processor. A user must communicate with a server processor to choose between search states, and thus is limited by communication delays and server processor workload delays. A need exists for a search method which stores a search state locally to the user.

Therefore, there is a need for a more inexpensive and more resource efficient, yet effective, method to search a set of documents. There is a need to perform such a search on a processor which is local to the user and which is remote from the document set. There is a need for an efficient and effective search method which allows users to search across different filtering criteria. There is a need for a search method which may allow for graphical searching and graphical query result representation on a local, user processor. There is no search method allowing for searching based on phrases which include information normally eliminated by stopping, stemming, and elimination of capitalization or searching based on variants of phrases or terms. There is no search method combining the capabilities of different processors, for allowing for a search state to be saved on a client processor and used at a later time, or for easily pre-filtering a search index.

Thus, an improved method for using document set representations for searching is desirable, and as will be disclosed in more detail below, the present invention provides the desired method as well as other desirable results, which will be readily apparent to those skilled in the art, upon reading the detailed description to follow.

SUMMARY OF THE INVENTION

A method and system are disclosed for searching a set of documents using compact integrated metadata. Each document comprises a set of terms. The metadata comprises a set of topic profiles, each topic profile defining a relationship between a topic and the documents, a set of distinguishing terms for searching the documents by their component terms, and a set of document surrogates for allowing the documents to be searched by topic or by term. The method and system create references from each topic profile to document surrogates relevant to the corresponding topic, and create a set of references from each distinguishing term to document surrogates containing that term. The method and system accept a query and search on the documents using the metadata. The method and system provide the ability to filter the metadata before presentation to the user and to integrate searching on a client processor with searching on a server processor. The method and system provide the ability to maintain a set of search states, each search state describing a subset of the documents to be searched, and a set of filters, which are the queries which resulted in the subset of documents.

BRIEF DESCRIPTION OF THE DRAWINGS

FIG. 2 is a block diagram illustrating the list of distinguishing terms of FIG. 1 according to an embodiment of the present invention.

FIG. 5 is a block diagram illustrating a topic profile of FIG. 1 according to an embodiment of the present invention.

DETAILED DESCRIPTION

I. Overview

Figure 1:
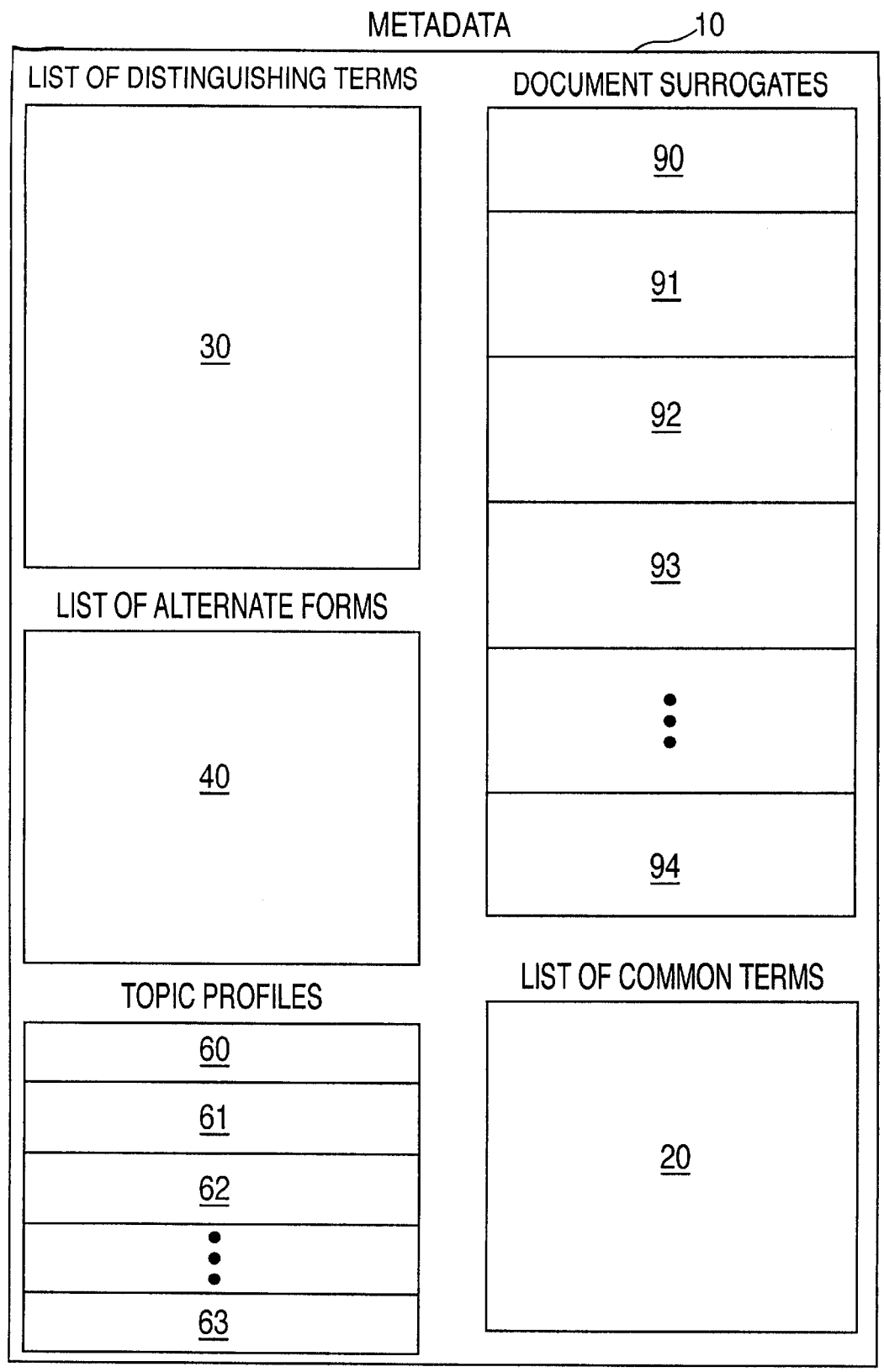
FIG. 1 is a block diagram illustrating the metadata according to an embodiment of the present invention.

The method and system of the present invention utilize a set of compact integrated metadata from a document set. In the IR art metadata refers to information which may be used to describe, search in, or otherwise analyze a set of data or documents. A conventional FTI is a form of metadata. The compact integrated metadata of an exemplary embodiment of the present invention allows a user to search a document set using more than one filtering method at a client processor which is remote from the actual document set. The compact size of the metadata of the present invention allows a processor local to the user to perform the search, eliminating delays associated with data transmission and remote processor workloads. That the search may be performed locally allows the state of search to be maintained on the local processor and applied to subsequent queries. The metadata may be filtered before being presented to the user to further reduce the size of the metadata and to focus the metadata based on user requirements.

The method and system of the present invention utilize integrated metadata, in which different types of search information about a set of documents is combined to allow efficient yet powerful searching of the set of documents. In an exemplary embodiment of the present invention each document is a file comprising text information. As used herein, documents may comprise other information in addition to text information, and may be web pages, legal decisions or any other collection of text and data.

It In an exemplary embodiment, the metadata of the present invention is derived by a server processor from a document set stored on or near the server. The metadata is distributed to client processors for searching. Query results are ranked lists of documents, and users may refer to the original document set, located remotely from the client processor, for the full set of information contained within the documents.

The metadata of the present invention is a compact representation of the original set of documents, taking up approximately 1–5% of the storage space required for the document set. This allows the metadata to be easily distributed to a local processor for searching. Furthermore, the proprietary content which allows some FTIs to be used to reconstruct the original document set is not contained in the metadata of the present invention. In an exemplary embodiment of the present invention, the metadata does not contain detailed information on term position which exists in conventional IR indexes. The actual documents, which may be proprietary, are usually maintained at a distance from the user, who must query the server processor to get access to these documents.

The compact integrated metadata of the present invention allows searching on the document set using more than one filtering criterion at the same time. In an exemplary embodiment of the present invention the metadata allows a document set to be searched by term information—the text of the documents—as well as topic information.

A topic may be an area of subject matter or interest—for example, "Kites" or "Object Oriented Programming." As used herein, a topic may also be any definition allowing documents to be categorized and separated. In an exemplary embodiment of the present invention, topics may be applied automatically to documents to provide ratings indicating varying degrees of relevance.

The term information contained in the metadata allows for searching based on compound terms, which are strings of tokens—i.e., phrases. The metadata of the present invention is highly efficient in that much of the information from the original document set is not included in the metadata, while information useful to searching is retained. Compound terms retain information lost through the stopping, stemming and elimination of capitalization which occurs when the metadata is created. When used herein, a "token" is an individual word, number, symbol or punctuation mark appearing in an original document. When used herein, "term" includes both tokens and compound terms. Terms in the metadata—both compound terms and tokens—are given alternate forms, externally defined equivalents, which allow users to search without explicitly defining every variant of a term. According to an exemplary embodiment of the present invention, terms appearing in documents may be represented in the metadata differently from their verbatim representation in the original document—for example, in a stemmed form or in a normal form, which is a standardized form of a term which may have multiple forms. As used herein, "term" may refer to any form of a term—for example, its stemmed, root form or an alternate or normal form of a term.

An exemplary embodiment of the present invention supports filtering of the compact integrated metadata based on a filter query generated by the user or in another manner. The metadata may be filtered at the server processor, the client processor or at any point in between. Filtering allows a smaller, more manageable and more focused set of metadata to be searched by the user, and when performed at a site remote from the client processor, filtering further reduces the amount of metadata that is transmitted to and stored by the client processor.

Another embodiment of the method of the present invention allows for searching at a client processor to be combined with searching on a server processor, and stores documents returned from a query as a search domain—a set of references to the documents over which a search is to be conducted. In such an embodiment information from each search is stored on the client processor to produce a more effective search. In conventional IR, when a user searches, the search domain is not adjustable at the client level. The user often enters an entirely new search for every iteration, often replicating information from a previous search. Storing the state of a user search eliminates this problem. Conventional IR allows a search state to be maintained on a server processor; however this may require large amounts of storage space if numerous users are involved. Storing the state of the search on a client processor eliminates the need for the server processor to maintain search process states for the numerous users serviced by the server processor.

II. Compound Terms And Alternate Forms Of Terms

In an exemplary embodiment of the present invention the terms in the metadata may be tokens or compound terms, which are strings of tokens—i.e., phrases. A token may be a term which is to be stopped; such tokens are the most common words in a given language and thus are not useful for searching.

Conventional IR methods may require a user to enter an exact representation of a term and all its variants in each search query. Conventional IR methods utilizing variants of terms allow for their use only after indexing is performed. The method and system of the present invention allow terms to have pre-defined alternate forms, and allow for such forms to be defined without reference to documents on which the forms may be used. Conventional methods may also eliminate information from the index which is useful in defining compound terms. The method and system of the present invention allow the use of compound terms and alternate forms which are defined prior to being searched, and allows their use to be transparent to the user.

Creating compound terms and alternate forms of terms prior to searching makes creating queries easier and faster for users, who do not have to define all forms of compound terms and variants of terms in queries. Users do not need to know of the existence of such terms to gain the benefit of their use.

Compound terms allow for the recognition of terms which can be described in a document as two or more tokens having a specified spatial relationship. The definition and use of compound terms allows for terms which are strings of one or more tokens to be treated as one term. For example, "Federal Bureau of Investigation" may be represented across documents and for the purpose of searching as one term. Unlike a conventional FTI, the metadata of the present invention lacks much information on term location. Thus allowing the metadata to include compound terms allows searching on phrases. Further, such phrase searching is easier and more powerful than searches using FTIs, as the compound terms of the present invention are pre-defined, may include alternate forms, and include information conventional methods strip away using stemming, stopping and elimination of capitalization. In an exemplary embodiment of the present invention, compound terms are listed as strings in a list of compound terms, and may be represented in the metadata by a token representing a normal form of the compound term.

The method and system of the present invention allow for searching on terms having multiple, alternate forms. Such terms are represented in a standard manner. Thus "Federal Bureau of Investigation" is represented in a standard manner if it appears across documents or searches in different ways, such as "FBI" or "Federal Bureau". Not all terms have alternate forms. For those terms having alternate forms, the term is referred to by a normal form, a string corresponding to one form of the term, or by a token corresponding to the normal form. The normal form of such a term may be its most common form. In an exemplary embodiment of the present invention, alternate forms of terms are listed in a list of alternate forms. The list of alternate forms is a list of lists of strings of alternate forms of terms. Allowing the metadata to include alternate forms of terms eliminates the need for a user to include all variants of terms in a search query.

In an exemplary embodiment of the present invention, tokens which can be stemmed are stored and used in their root form. Stemming strips tokens of certain suffixes such as "ing", "ation" and indications of plurality. Thus "work", "working" and "works" are represented as "work." An occurrence of a stemmed variant such as "working" in a document or in a user search entry is processed and stored as if it were equivalent to the token "work." Furthermore, tokens that are not defined as compound terms or alternate forms are stored with capital letters converted to lower case.

III. The Metadata

An exemplary embodiment of the method and system of the present invention utilizes compact integrated metadata comprising information allowing a set of documents to be searched based on both the topics relevant to the documents and the text contained in the documents. The metadata is a reduced representation of the document set, taking up a fraction of the storage space of the document set. The document set may or may not be related by subject area. The metadata is searched using a query entered by the user containing topics to be searched and keywords of text to be searched.

Referring to the figures in which like numerals indicate like elements, FIG. 1 is a block diagram illustrating the metadata 10 according to an embodiment of the present invention. In an exemplary embodiment of the present invention the metadata 10 comprises a list of common terms 20, for providing more accurate searching, a list of distinguishing terms 30 for determining which documents in the document set contain a given term, and a list of alternate forms 40 for allowing terms to be represented in multiple forms. Metadata 10 further comprises a set of document surrogates 90–94, one surrogate for each document in the original set of documents. Each document surrogate 90–94 is a reduced representation of a document in the original document set, and describes the document to a user, allows the document to be located, and allows the document to be searched using the metadata 10 of the present invention. Metadata 10 includes a set of topic profiles 60–63, each topic profile 60–63 describing a topic and allowing a determination to be made as to how much a given document relates to the topic.

FIG. 2 is a block diagram illustrating the list of distinguishing terms 30 of FIG. 1 according to an embodiment of the present invention. The list of distinguishing terms comprises terms 31–35 which may be used to search the documents. In an exemplary embodiment of the present invention, these terms are useful in searching because they are the least common terms in the document set, and thus may distinguish among documents. Terms are stored in the list of distinguishing terms 30 in order of their frequency of occurrence in the document set, from most to least frequent. This allows for better encoding of the list of distinguishing terms 30, and allows for terms in the list of distinguishing terms 30 to be referenced using a space saving method similar to a Huffman encoding method. Such a method allows pointers to terms occurring more frequently in a data set to be encoded using fewer bits than those occurring less frequently.

In an exemplary embodiment of the present invention, the lists of common terms 20 and distinguishing terms 30 are generated automatically by a server processor, local to the actual document database. The union of the list of common terms 20 and the list of distinguishing terms 30 comprises all (non-stopped) terms in the document set, presented in their normal form or in their stemmed and uncaptilalized form. The terms in the latter list are those that are less common in the document set than those in the former list. In an exemplary embodiment the size of the list of distinguishing terms 30 is pre-set, for instance to 65,535 entries, or may be determined according to the number of terms in the document set. The list of common terms 20 is of unlimited size. In an exemplary embodiment, terms are stored in the list of distinguishing terms 30 in order of frequency, from most to least frequent. Thus the list of distinguishing terms 30 is the list of the N least common terms in the set of documents, where N is may be a pre-set size or is determined according to the number of terms in the document set. Unlike prior art IR methods, all uncommon terms are considered distinguishing, even if they appear in as few as one of the documents.

All terms in the metadata may be compound terms. In an exemplary embodiment, a compound term is represented as a list of tokens, i.e., a string, which is the normal form of the compound term. A compound term may be represented in the metadata by a token representing the normal form of a compound term, which may be derived the compound term itself. For example, the token representing the normal form of "bicycle chain" may be "%bicycle_chain".

A token is represented in the metadata by the token itself (i.e., the actual word), a token representing a normal form of the term, or by a pointer to the token. Tokens which may be stemmed are represented in their root form. Stemming strips tokens of certain suffixes such as "ing", "ation" and indications of plurality. Tokens are stored with capital letters converted to lower case.

Figure 3:
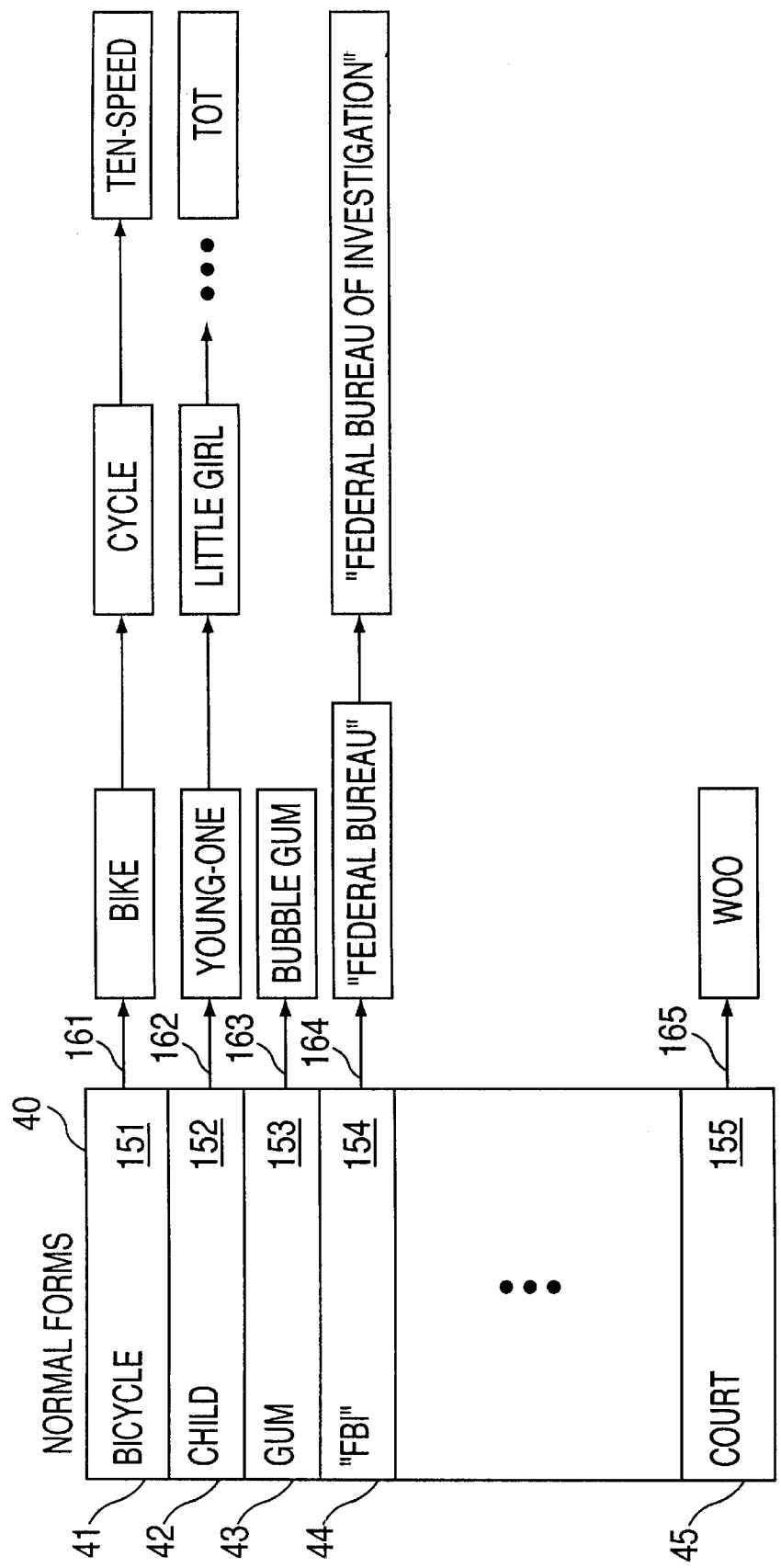
FIG. 3 is a block diagram illustrating the list of alternate forms of FIG. 1 according to an embodiment of the present invention.

FIG. 3 is a block diagram illustrating the list of alternate forms 40 of FIG. 1 according to an embodiment of the present invention. For each term in the document set having alternate forms, an entry 41–45 exists in the list of alternate forms 40. The head 151–55 of each entry is a string corresponding to the normal form of the term. The remainder 161–65 of each entry is a list of strings representing variations of that term. In an exemplary embodiment the strings are connected by pointers leading in one direction from the head of the list to the last entry. However, other structures may be used to form the lists.

In an exemplary embodiment of the present invention, all terms in the metadata (both compound terms and tokens)

may have alternate forms. Terms with alternate forms are represented in the lists of common terms 20 and distinguishing terms 30, and in document surrogates 90–94, in their normal form or as a token representing the normal form. The normal form of the term is a standardized form for referring to the term. As with compound terms, the token for the normal form of an alternate form may be derived from the normal form of the alternate form. The actual term appearing in the original document may be an alternate form of the term.

Figures 4, 16:
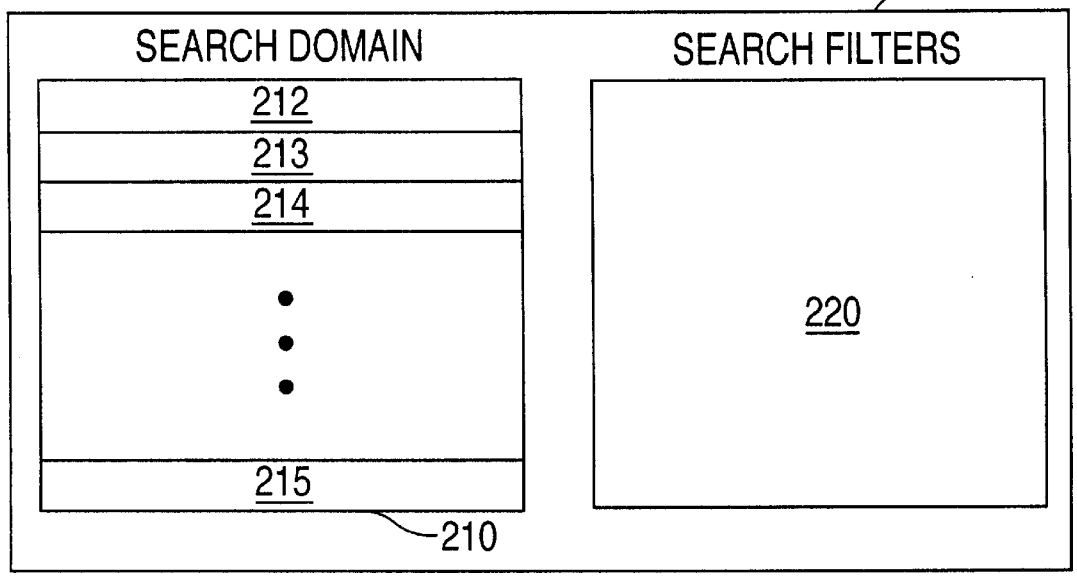
FIG. 4 is a block diagram illustrating the list of common terms of FIG. 1 according to an embodiment of the present invention.
FIG. 16 is a block diagram illustrating search process state 200 of FIG. 15 according to an embodiment of the present invention.

FIG. 4 is a block diagram illustrating the list of common terms 20 of FIG. 1 according to an embodiment of the present invention. The list of common terms 20 comprises terms 21–25 which occur frequently in the document set relative to distinguishing terms, and are thus less useful than distinguishing terms in distinguishing among the documents, given a large document set size. In an exemplary embodiment of the present invention, during searching, the list of common terms 20 eliminates the need for an assumption resulting in false positives. Without the use of the list of common terms, when a term appears in a query which is not in the list of distinguishing terms 30 or alternate forms 40 the search process must either assume none of the documents contain the term, resulting in false negatives (where the search process does not return documents that fit the intended search criteria), or assume all of the documents contain the term, resulting in false positives (where documents are returned that do not fit the intended criteria). The system and method of the present invention assumes only that terms in the list of common terms 20 are in all documents; thus the assumption is made only for certain terms. During searching on the metadata 10, only terms in the list of distinguishing terms 30 and list of alternate forms 40 are used to return specific documents. If a term in the query is not in either of the list of distinguishing terms 30 or the list of alternate forms 40, its appearance in the list of common terms 20 prevents documents from being rejected from the query results because the documents lack the term. Terms in a query not occurring in any of the list of distinguishing terms 30, list of alternate forms 40 and list of common terms 20 may result in rejection of a document from a search result, or the lowering of the ranking of a document in a query result.

FIG. 5 is a block diagram illustrating a topic profile 60 of FIG. 1 according to an embodiment of the present invention. Each topic profile 60 describes a topic in such a manner as to allow a determination to be made as to how much a given document relates to the topic. A topic is an area of subject matter or interest—"Kites" or "Object Oriented Programming," for instance. A topic may also be any definition allowing documents to be categorized and separated. Each topic profile 60 comprises a topic name 70, identifying the topic profile, a topic summary 72, providing a brief text description of the topic, and a set of profile terms 80–83, for determining the relevancy of the topic to a document. Each profile term 80–83 which has more than one form or which is a compound term is represented in topic profile 60 as the normal form of that term.

In an exemplary embodiment of the present invention each profile term 80–83 in topic profile 60 has a corresponding weight 85–88, allowing the relevance of the topic to a document to be measured and quantified based on the occurrence of profile terms in the document. The weight allows the profile term to be used to evaluate the relevance of a given document to the topic of topic profile 60. In an exemplary embodiment, the weight is a number which is considered relative to other term weights, and represents the relevance of a document containing that term to the topic of topic profile 60. In an exemplary embodiment, to determine the relevance of a document to a topic, for each profile term appearing in the document surrogate, a relevancy rating is increased by the weight corresponding to that profile term.

In alternative embodiments, the weight may allow for a more complex evaluation. For example, in addition to having a numerical weight, the profile term may provide an indication that the existence of the term in a document is either necessary or sufficient for that document to pass a threshold level of relevance to the topic. In other embodiments, topic profiles 60–63 may be created in a hierarchy of topics and sub-topics. In such embodiments a topic profile may include as its definition the terms included in its sub-topics.

In an exemplary embodiment of the present invention, metadata 10 comprises a set of document surrogates 90–94, one document surrogate for each document in the original set of documents. Each document surrogate 90–94 corresponds to a document in the original document set and is a reduced representation of that document. The document surrogate describes the document to a user, allows the document to be located in the document set, and allows the document to be searched for using the metadata 10 of the present invention. Document surrogates 90–94 allow for searching the set of documents based on the terms of the document, and in addition allow the documents to be analyzed and categorized by relevancy to different topics.

Figure 6:
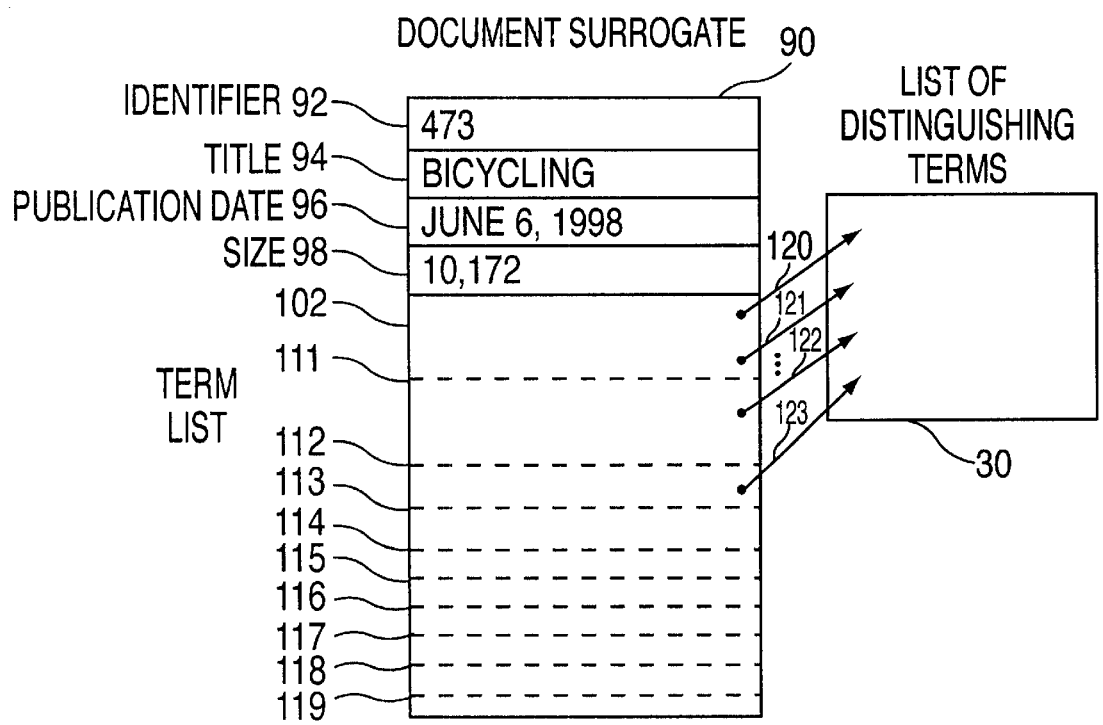
FIG. 6 is a block diagram illustrating a document surrogate of FIG. 1 according to an embodiment of the present invention.

FIG. 6 is a block diagram illustrating a document surrogate 90 of FIG. 1 according to an embodiment of the present invention. Document surrogate 90 includes a term list 102 of terms contained in the corresponding document, which is used in searching the document set. Each document surrogate 90 includes an identifier 92, for retrieving the document from the original document set, a title 94, a publication date 96 and the size 98 of the document. In an exemplary embodiment the size 98 is expressed in bytes.

In an exemplary embodiment of the present invention document surrogate 90 includes a term list 102 of terms used in the document, separated by term list separators 111–19. The term lists in the document surrogates allow for searching of the list of documents by the terms in the documents. In an exemplary embodiment term list 102 consists of a sequence of entries, one entry for the first occurrence of each term in the document corresponding to the surrogate. Entries occur in term list 102 in the order in which their corresponding terms first appear in the document. Entries are pointers 120–23 to the normal forms of the terms in the list of distinguishing terms 30. In an exemplary embodiment, term list pointers 120–23 are references coded using a method similar to a Huffman method, referring to the list of distinguishing terms 30. As used herein, a reference may be any method or data structure for referring to another data structure, including a pointer, index number, address or title.

Term list separators 111–19 separate term list 102 into zones. Zones are useful during a document search, as a term first appearing near the beginning of a document is a better indication of the subject matter of the document than a term first appearing near the end of a document. Dividing the term list into zones provides a low cost manner of indicating the importance of a term to a document. In an exemplary embodiment of the present invention the term list in a document surrogate is divided into ten zones of substantially equal size by nine term list separators.

In an exemplary embodiment of the present invention document identifier 92 is a record number allowing the document to be retrieved from the text database. In alternate embodiments of the present invention, document identifier 92 may be any way to uniquely identify the document—a web site address, a legal case name, etc. Document surrogate 90 may include in addition to publication date 96 additional dates such as the date of the most recent update or edit of the document. Document surrogate 90 includes in alternative embodiments the number of images, if any, contained within the document, and may contain an abstract of the document, which may be generated manually, by a human operator, or automatically. Machine based abstract generation methods are well known.

In one alternate embodiment alternate forms and compound terms are included in topic profiles; each topic profile includes a list of compound terms and a list of alternate forms relevant to that profile. Each compound term in a topic profile's list of compound terms is a string and has a normal form used to represent the term in the metadata. Each topic profile includes a list of alternate forms. An alternate form in the list of alternate forms may be a string of tokens: such strings are enclosed in quotes. If the normal form of an alternate form is such a string, it is represented elsewhere in the metadata as the string with spaces replaced with underscores. The alternate forms list may include alternate forms of compound terms. In this embodiment a user may define an empty topic profile to contain miscellaneous compound terms which are not part of any other topic profile.

In another alternate embodiment, the list of common terms and distinguishing terms may be combined into one list. In such an embodiment, the list is sorted according to frequency in the document set, from least to most frequent. The first N terms of this list are considered to be distinguishing terms, and have the appropriate pointers from the document surrogates. The remainder of entries in the list are considered to be common terms, and thus have no such pointers.

Alternative embodiments of the present invention need not use compound terms or alternate forms, but may rely instead on tokens only, with or without alternate forms. The term lists in the document surrogates may utilize terms themselves instead of pointers, may utilize alternative methods to divide the term list into zones and may provide for alternate numbers of zones. In other embodiments, alternate forms may be listed using different data structures.

In an alternate embodiment a user may create some or all of the topic profiles after receiving the metadata at the client processor. In such an embodiment, it is not necessary that any topic profiles be created at the server processor and transmitted to the client processor as part of the metadata.

IV. Method Of Searching Using Metadata
1. Supplemented Metadata

Figure 7:
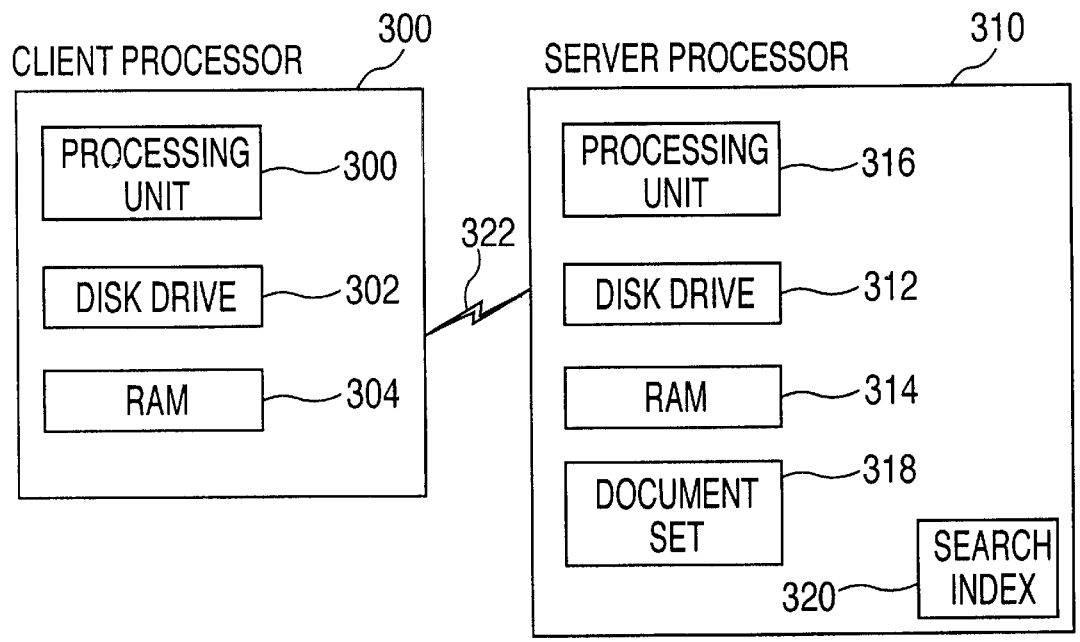
FIG. 7 is a block diagram illustrating a computer system according to an embodiment of the present invention.

The method and system of the present invention can be implemented using hardware, software (with stored instructions directing a processor or processors), or both hardware and software. FIG. 7 is a block diagram illustrating a computer system according to an embodiment of the present invention. Client processor 300 includes disk drive 302, for storing data in the form of a plurality of files, random access memory ("RAM") 304, providing non-permanent storage of data and program instructions, and processing unit 306 for executing instructions and controlling the operation of client processor 300. Likewise, server processor 310 includes disk drive 312, for storing data in the form of a plurality of files, RAM 314, providing non-permanent storage of data and program instructions, and processing unit 316 for executing instructions and controlling the operation of server processor 310. Server processor 310 may store a set of documents 318 and a document search index 320 for searching on the set of documents. Document search index 320 may be, for example, an FTI. Document set 318 and document search index 320 need not be stored on server processor 310. Communications link 322 allows client processor 300 and server processor 310 to communicate.

In an exemplary embodiment of the present invention, server processor 310 creates a set of compact integrated metadata 10 from the set of documents 318 and transmits metadata 10 to a client processor 300, which searches metadata 10. The metadata 10 is a compact representation of the document set, which allows searching on the document set using more than one filtering criterion. In an exemplary embodiment two search spaces are used, one allowing searching on the topic of each document and another allowing searching on the terms used in each document. Metadata 10 may be distributed on, for example, a storage device such as a floppy disk or CD-ROM, instead of being transmitted. Client processor 300 searches the metadata 10 with a user entered query, and the results of the query are a set of references to documents local to server processor 310. Client processor 300 may access the actual documents by making a request to server processor 310. In other embodiments searching may be conducted at processors other than client processor 300; for instance searching may be conducted at server processor 310.

In an exemplary embodiment of the present invention metadata 10 comprises a set of topic profiles 60–63, a set of document surrogates 90–94, a list of common terms 20, a list of distinguishing terms 30, and a list of alternate forms 40. Metadata 10 is supplemented by client processor 300 prior to being used for searching. Additional information, derived from metadata 10, is added to the metadata itself to facilitate searching over the document set.

Client processor 300 adds information derived from metadata 10 to the metadata itself to facilitate searching over the document set; the result is supplemented metadata. Client processor 300 creates data structures indexing the document surrogates 90–94 by term and by topic. Client processor 300 creates a compact term index, a list of documents indexed by term. The compact term index comprises the list of distinguishing terms 30 with pointers referencing document surrogates containing terms in this list. For each term in the lists of distinguishing terms 30 which occurs in a particular document surrogate, client processor 300 creates a reference or pointer from the term's entry in the list to each document surrogate 90–94 including that term. This process is known in the IR art as inversion, and allows the list of documents to be searched quickly by term.

In an exemplary embodiment of the present invention, the list of topic profiles 60–63 is similarly inverted. Client processor 300 creates a topic index, which in an exemplary embodiment comprises a list of document surrogates where the document surrogates are indexed by relevant topic. The topic index comprises pointers from topic profiles to relevant document surrogates.

Client processor creates a set of topic references for each topic profile. A topic reference indicates the relevancy of a topic represented by a profile to a document. In an exemplary embodiment a topic reference is a topic value, a number indicating the level of correspondence; a topic reference of zero indicates there is no correspondence. In alternative embodiments a topic reference may be a pointer or other reference allowing a topic profile to indicate which documents are relevant to the topic. If no documents are relevant to a topic the set of topic references for the corresponding topic profile may be empty, or may be a set of zero values.

In an exemplary embodiment, in order to determine the relevance of each document to each topic profile client processor 300 generates for each document surrogate-topic profile pair a topic value. The topic value for each pair is calculated using the weights attached to profile terms of the topic profile which also appear in the document surrogate. Most topic values are zero. Each non-zero topic value is added to the document surrogate of the document surrogate-topic profile pair as a topic reference. In an alternative embodiment the topic value is added to the topic profile of the pair.

Figure 8:
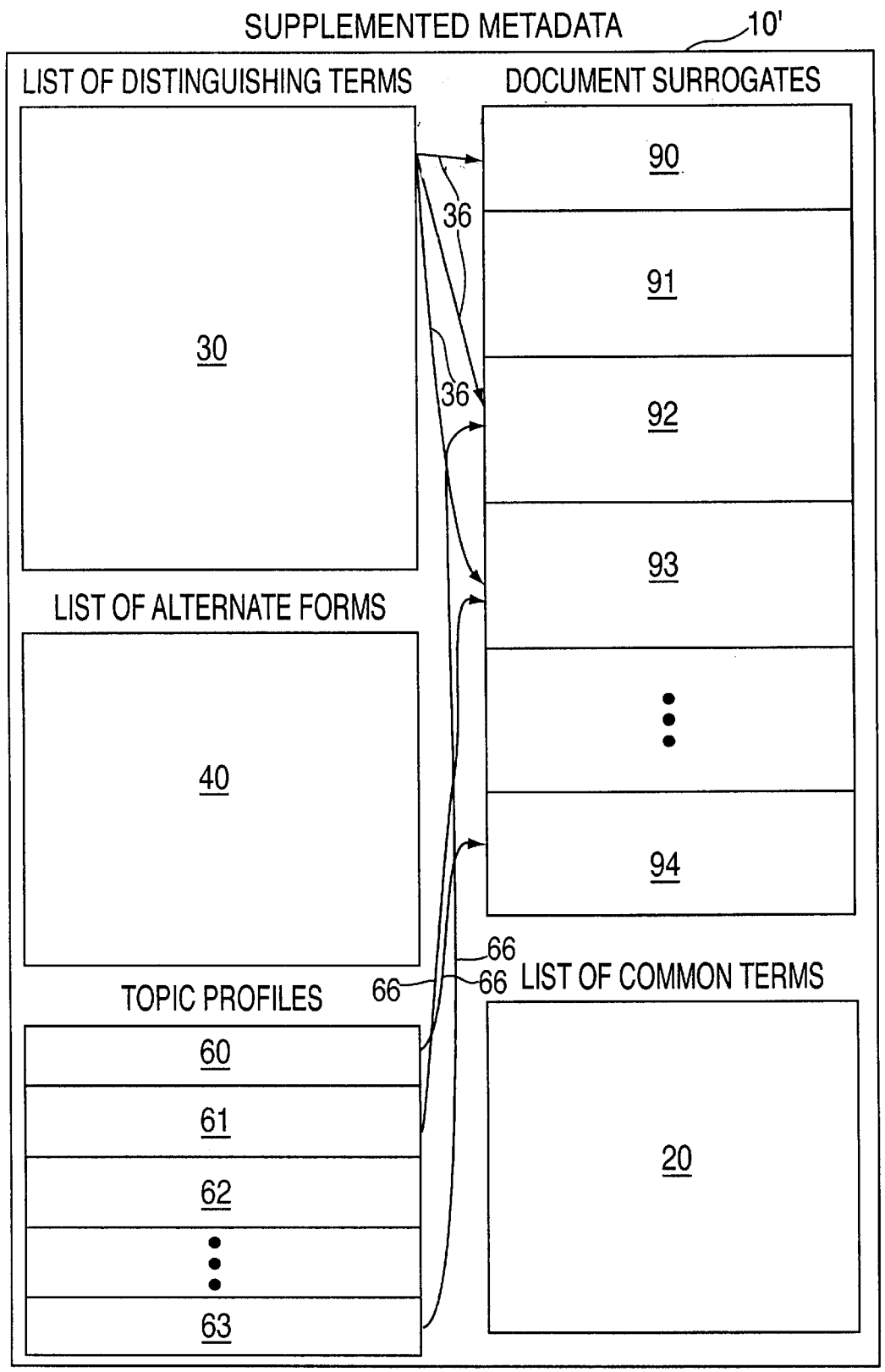
FIG. 8 is a block diagram illustrating the supplemented compact integrated metadata 10' according to an embodiment of the present invention.

FIG. 8 is a block diagram illustrating the supplemented compact integrated metadata 10' according to an embodiment of the present invention. Metadata 10' is substantially similar to metadata 10 of FIG. 1, with the addition of two sets of pointers. In an exemplary embodiment of the present invention supplemented metadata 10' includes a set of pointers 66 from topic profiles 60–64 to document surrogates 90–94 for allowing topic profiles 60–64 to be used to search over the document surrogates 90–94, and a set of pointers 36 from terms in the list of distinguishing terms 30 to document surrogates 90–94 for allowing distinguishing terms to be used to search over the document surrogates 90–94.

Figure 9:
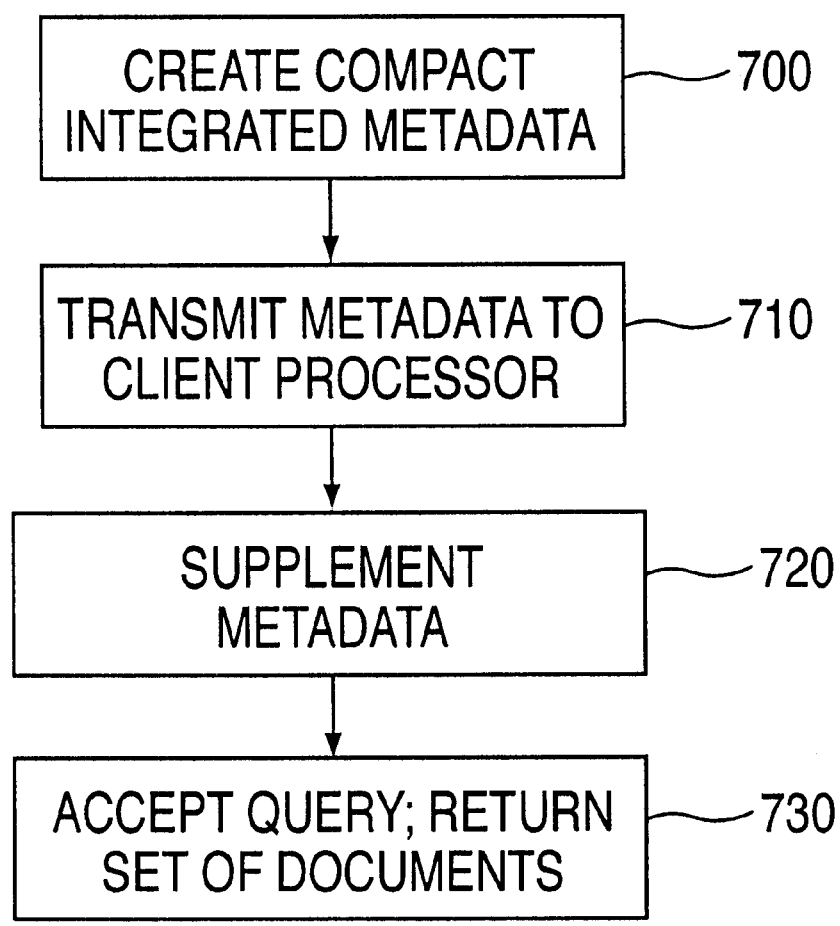
FIG. 9 is a flow chart illustrating the operation of the method for searching the compact integrated metadata of FIG. 1 according to an embodiment of the present invention.

FIG. 9 is a flow chart illustrating the operation of the method for searching the compact integrated metadata 10 of FIG. 1 according to an embodiment of the present invention.

Referring to FIG. 9, in step 700, server processor 310 creates a set of compact integrated metadata 10 from document set 318.

In step 710, server processor 310 transmits metadata 10 to client processor 300 via communications link 322. Other embodiments may transmit metadata 10 to client processor 310 via other means, or may use metadata 10 on the processor on which it is created, rather than transmitting metadata 10 to another processor.

In step 720 client processor 300 adds information derived from metadata 10 to the metadata itself to facilitate searching over the document set; the result is supplemented metadata 10'. In other embodiments metadata 10 may be supplemented by the processor creating metadata 10; this may be done at the time of the creation of the metadata.

In step 730 client processor 300 accepts a query, searches on metadata 10' and returns a ranked set of documents corresponding to the query.

2. Supplementing Metadata to Allow for Searching

Client processor 300 adds information derived from metadata 10 to the metadata itself to facilitate searching over the document set; the result is supplemented metadata. To supplement metadata 10 client processor 300 creates data structures indexing the document surrogates 90–94 by term and by topic.

Figure 10:
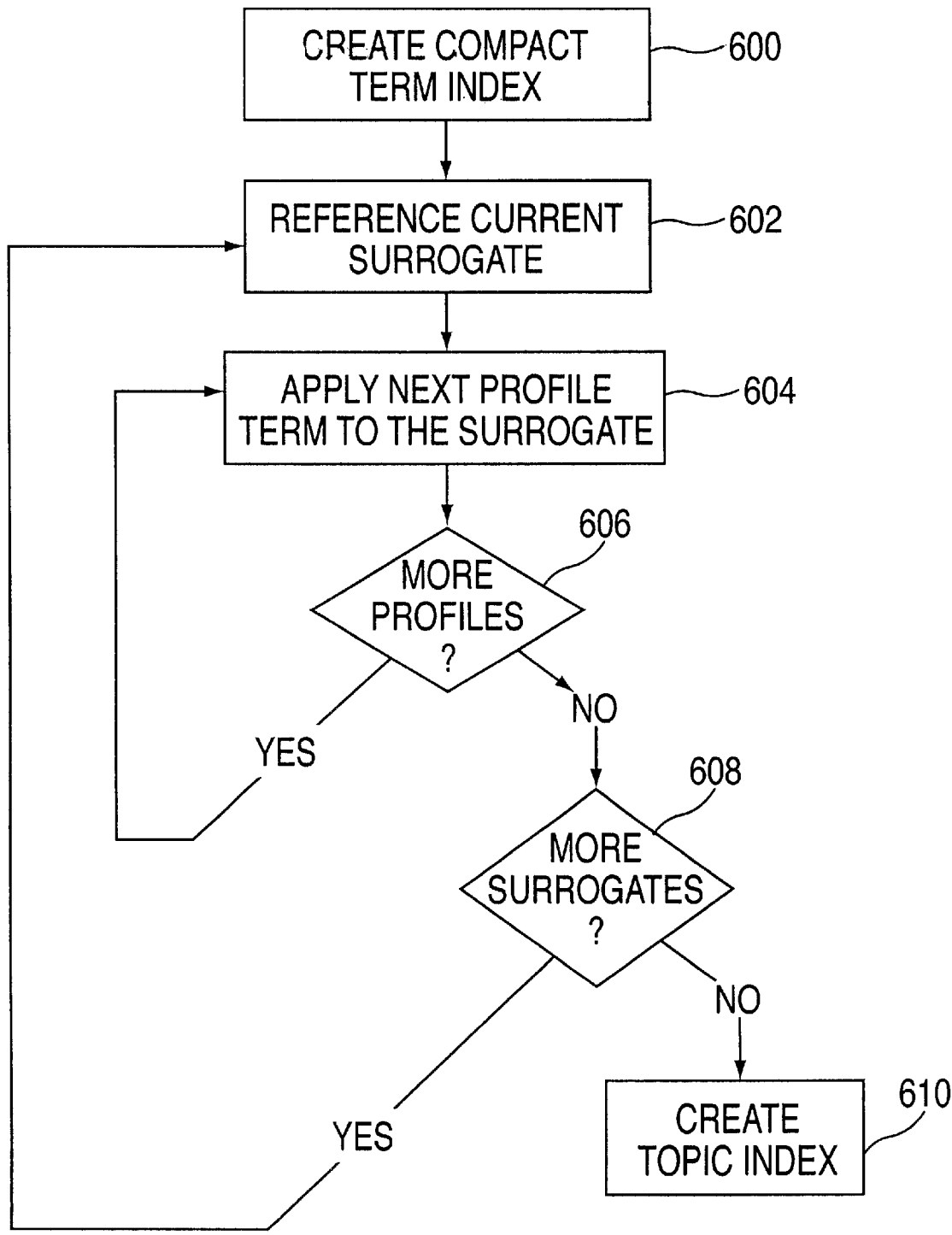
FIG. 10 is a flow chart illustrating the operation of the method for supplementing the compact integrated metadata of FIG. 1 to produce supplemented metadata of FIG. 8 according to an embodiment of the present invention.

FIG. 10 is a flow chart illustrating the operation of the method for supplementing the compact integrated metadata 10 of FIG. 1 to produce supplemented metadata 10' of FIG. 8 according to an embodiment of the present invention.

Referring to FIG. 10, in step 600, client processor 300 creates a compact term index, comprising the list of distinguishing terms 30 with pointers from terms in the list to document surrogates 90–94 containing the terms. For each term in the list of distinguishing terms 30 which occurs in a document surrogate, client processor 300 creates a reference or pointer from the entry for that term in the list of distinguishing terms 30 to each document containing that term. Prior to the creation of the compact term index, document surrogate entries point to the list of distinguishing terms 30; after the creation of the compact term index pointers exist in the opposite direction as well. The list of alternate forms 40 is supplemented to allow searching on this list and to allow entries in this list to point to associated normal forms in the list of distinguishing terms 30.

In an exemplary embodiment, to allow searching on alternate forms of terms, client processor 300 creates additional pointers in each entry in the list of alternate forms 40. When created pointers in each entry lead from the head of the entry, the normal form of the term, to the tail; during the supplementation process pointers are created in the reverse direction. This allows a reference to an alternate form to produce the normal form of that term; thus an alternate form in a query or topic profile may be converted to its normal form to reference document surrogates containing that alternate form.

In an alternate embodiment a different method may be used to search by term, one not requiring an inverted list of distinguishing terms 30.

Since the list of common terms 20 has terms which occur frequently in the document set, and are thus not as useful in distinguishing among the documents as distinguishing terms given a large document set size, this list does not have pointers attached to the terms during the creation of the compact term index.

In steps 602–610 client processor 300 determines topic values and creates a topic index, which in an exemplary embodiment of the present invention comprises a list of document surrogates 90–94 where the document surrogates are indexed by relevant topic using pointers from the topic profiles 60–63 to the document surrogates.

In step 602, client processor 300 references a document surrogate in order to apply the surrogate to topic profiles 60–63.

In steps 604–606 client processor 300 iterates through topic profiles 60–63, applying each profile to the current document surrogate.

In step 604 client processor 300 selects the next topic profile and applies the topic profile to the current document surrogates. For each term in the topic profile, client processor 300 determines if the profile term is in the surrogate's term list, using the list of distinguishing terms 30. In an exemplary embodiment the list of alternate forms 40 may be used to convert alternate forms of terms appearing in the topic profile to their normal form to allow searching. In an alternate embodiment topic profile terms are in their normal form.

Each term in the list of distinguishing terms 30 in supplemented metadata 10' includes a list of references or pointers to the document surrogates containing that term, created in step 600. If, for a given profile term in a topic profile, that term's entry in the list of distinguishing terms 30 indicates the term is in a particular document surrogate, the topic value for the document surrogate-topic profile pair comprising the document surrogate and the current topic profile is adjusted according to the numerical value of the weight that profile term has in that topic profile. The numerical value of the weight is added to the topic value. In this manner each profile term in each topic profile is applied to the documents containing that term and adjusts the topic value for each document surrogate-topic profile pair. Since weights are defined relative to each other, after a topic value is summed a normalization constant is applied to normalize topic values relative to each other.

In an exemplary embodiment of the present invention, a term appears in each document surrogate 90–94 only once, even if the term appears multiple times in the original document. Thus terms which are repeated in the actual document text do not have greater weight in the calculation of the topic value. In an exemplary embodiment the term list in each document surrogate 90–94 is divided into ten zones. Terms which first appear in zones which occur earlier in a document surrogate term list are considered to be more indicative of the subject matter of the document than those first appearing in later zones. Before being applied to a topic value the weight for a term is modified based on the zone in the document surrogate in which the term appears, so that terms appearing in zone one are considered ten times more indicative of the relevance of the topic to the document then terms appearing in zone ten; terms appearing in intermediate zones have their weights similarly adjusted. Thus, terms appearing in zone one do not have their weight adjusted, terms appearing in zone two have their weight multiplied by 0.9, terms in zone ten have their weight multiplied by 0.1, and terms in zones two through eight have their weights adjusted accordingly.

In an exemplary embodiment of the present invention, the topic value for a document surrogate-topic profile pair is represented as:

$$V(\text{document surrogate, topic profile}) = N \cdot \sum_{k=1}^{n} DTERM_k \cdot PTERM_k \cdot IMPORT_k$$

where $DTERM_k$ is a one or zero value representing whether the $k^{th}$ profile term of the topic profile containing n terms is included the document surrogate, $PTERM_k$ is the weight for the $k^{th}$ profile term of the topic profile, $IMPORT_k$ is the adjustment to the $k^{th}$ profile term weight based on the zone in the document surrogate term list in which the $k^{th}$ profile term appears, and N is a normalization constant.

A term appearing as a profile term in more than one topic profile 60–63 may have a different weight in each topic profile, indicating a differing indication of relevancy to each topic. A topic profile may include terms not appearing in a set of document surrogates to which it is applied.

In step 606, client processor 300 determines if all topic profiles have been applied to the current document surrogates. If there are no more topic profiles to apply, client processor 300 proceeds to step 608, if there are more terms, client processor 300 proceeds to step 604.

In step 608, client processor 300 determines if all document surrogates 90–94 have been applied to topic profiles 60–63. If there are no more document surrogates 90–94 to apply, client processor 300 proceeds to step 610, if there are more document surrogates 90–94, client processor 300 proceeds to step 602.

In step 610, client processor 300 creates the topic index, an inverted list of topics with links to relevant document surrogates. To create the topic index, for each topic in the set of topic profiles, client processor 300 creates a set of topic links or references, pointers to each document surrogate which is relevant to that topic. A document surrogate is relevant to a topic if the topic value for that document surrogate-topic profile pair is non-zero. As with the term inversion, this inversion allows the list of documents to be searched quickly by topic profile. In an alternate embodiment, topic links may be created only if a topic value is greater than a certain threshold.

Other embodiments may use different methods for inverting the list of distinguishing terms, creating the topic index, and determining the relevancy of a topic to a document.

3. Searching on the Supplemented Metadata

To allow a user to search on the supplemented metadata 10', client processor 300 accepts a query and returns a ranked set of documents corresponding to the query. The user has available a list of topics, specified by topic name. Each topic name specifies a topic profile 60–63. In one embodiment, brief descriptions or summaries of each topic may be available to the user. The set of returned documents is ranked based on the relevance to the query. In an exemplary embodiment of the present invention a query consists of topics and terms.

The user does not need to be informed which phrases in the document set are identified in the supplemented metadata 10' as compound terms, and which terms have alternate forms. The client processor recognizes such phrases and terms by referencing the list of alternate forms 40 and the list of distinguishing terms 30. In an exemplary embodiment, while a list of compound terms is used to create metadata at server processor 310, such a list need not be included in the metadata 10 sent to client processor 300, as the lists of common terms 20 and distinguishing terms 30 contain all relevant compound terms in document surrogates 90–94.

Figure 11:
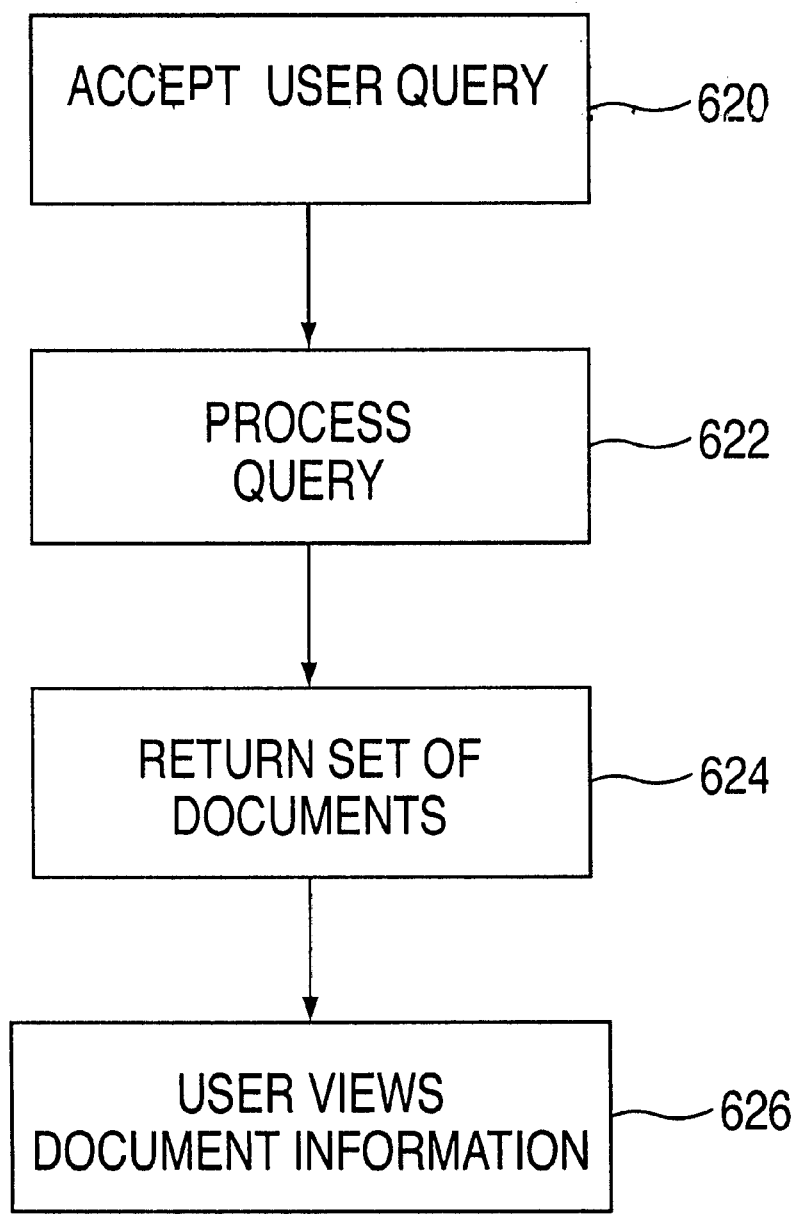
FIG. 11 is a flow chart illustrating the operation of the method and system for accepting a query and returning a ranked set of documents using the supplemented compact integrated metadata of FIG. 8 according to an embodiment of the present invention.

FIG. 11 is a flow chart illustrating the operation of the method and system for accepting a query and returning a ranked set of documents using the supplemented compact integrated metadata 10' of FIG. 8 according to an embodiment of the present invention.

Referring to FIG. 11, in step 620, client processor 300 accepts a user query comprising a list of topics and terms. Unlike common IR methods, no ordering information is included in the query. Topics in the query are identified by a modifier "topic( )". Compound terms may be delimited with quotation marks. Compound terms are also recognized automatically; the sequence of terms comprising the query is scanned for groupings of terms which constitute compound terms. The query:

topic(airplanes) topic(electronics) radar global positioning system returns all documents described in the supplemented metadata 10' relevant to the subjects of airplanes and electronics and having the terms radar, global, positioning and system. If any included terms have alternate forms defined in the supplemented metadata 10' documents having those alternate forms (and satisfying the rest of the query) are returned. If, for example, "global positioning system" is defined in the list of common terms 20 or the list of distinguishing terms 30 as a compound term client processor 300 returns documents fitting the other query requirements and having the phrase "global positioning system" in the text.

In step 622, client processor 300 processes the query, by applying the topics and the terms in the query to document surrogates 90–94. In an exemplary embodiment of the present invention, for each document surrogate 90–94 in supplemented metadata 10', server processor 310 creates a query rating, which is used to rank the documents according to the query. All query ratings are initially zero. Document surrogates having a query rating of zero after the query is applied to the supplemented metadata 10' are not returned as part of the search results. Client processor 300 rates document surrogates 90–94 based on topic values of topics in the query and the existence of query terms in document surrogates 90–94. In alternate embodiments different methods of specifying user queries may be used, for instance methods using visualization or other graphical interface methods.

For each topic in the query, client processor 300 iterates through the list of topic profiles 60–63. If a topic is found in a query, the query ratings for all document surrogates 90–94 which are relevant to that topic (i.e., to which the topic's profile has a pointer) are increased by the value of the topic value of the particular document surrogate-topic profile pair. In an exemplary embodiment of the present invention the topic value for a document surrogate-topic profile pair is stored with the corresponding document surrogate in supplemented metadata 10'.

For each term in the query, client processor 300 iterates through the list of distinguishing terms 30 and the list of alternate forms 40. If a query term matches a term in the list of alternate forms 40, the normal form of the term is selected and used to reference the list of distinguishing terms 30. If a term has a pointer from its entry in the list of distinguishing terms 30 to a document surrogate, the term is in the document, and the query rating for the document is increased by a term factor. In an exemplary embodiment the term factor is a fixed amount, 1, modified according to the term list zone in which the query term appears. Modifying the term factor according the zone in which the term appears is described in greater detail above with respect to topic values. If the query term appears in the first zone, the query rating for that document surrogate is increased by 1, if the query term appears in the second zone, the query rating is increased by 0.9, etc.

In an exemplary embodiment of the present invention, for the purposes of the search, common terms in the query are assumed to be in all documents and thus have no effect on the query results. Common terms are not as useful to the search process as distinguishing terms. Thus to reduce the size of metadata 10 common terms are not included in or referenced by document surrogates 90–94. If all terms in the query appear in the list of common terms the user is warned that the terms of the query cannot distinguish among the documents based on the query terms. Terms in the query not appearing in the list of common terms 20, list of distinguishing terms 30 or list of alternate forms 40 are not in any documents in the document set. Such terms may result in a reduced query result, as the query ratings of the documents may be reduced.

During searching, compound terms and alternate forms are detected before stopping, stemming and capitalization elimination are carried out, as it is desirable to define and recognize compound terms and variants of terms by the exact form of their component token or tokens, and such terms may contain terms to be stopped. Client processor 300 recognizes compound terms and alternate forms of terms by their entry in the lists of distinguishing terms 30 and alternate forms 40. In an alternate embodiment, compound terms and alternate forms may be marked so that they are recognized after stopping, stemming and capitalization elimination.

Except for terms which are identified as compound terms or alternate forms, terms in the query are stopped, stemmed and have their capital letters converted to lower case prior to being used for searching. Terms in the supplemented metadata 10' which are neither compound terms nor terms having alternate forms are stored in their root (stemmed) form with their capitalization eliminated.

In step 624, client processor 300 returns to the user a ranked set of documents corresponding to the query. The titles of the document surrogates in the returned set of documents are presented to the user. The set of returned documents is ranked based on the query rating of each document, which indicates relevance to the query. Documents having a query rating of zero are not included in the set of returned documents. In alternate embodiments different methods may be used to present documents to a user, and degrees of relevancy may not be calculated.

In step 626, the user may view metadata information on each document in the search result, such as the document title, author, source and publication date. The supplemented metadata 10' may include document abstracts. In addition, the user may ask client processor 300 to query the remote database for the full text of certain documents. The supplemented metadata 10' includes only data derived from and describing documents from the original set of documents. In an exemplary embodiment the full text of the documents is kept in document set 318 at server processor 310.

An embodiment of the present invention processes nested queries, where the query topics and terms are connected using parentheses and connectors such as "and" and "or." Such techniques are well known in the IR art. In an alternate embodiment topics and terms may be modified in several ways, such as with the modifier "not" or with a user entered weight. Groups of topics and terms, modified by modifiers and joined by connectors, may be set apart by parentheses and themselves joined or modified with other terms, topics or groups.

In an alternate embodiment, the search method of the present invention may be integrated with FTI searching. The set of documents returned by the query may be sent to server processor 310 along with an FTI query, and an FTI search may be performed on this reduced set of documents.

In other embodiments, the user may form the query with the aid of visualization tools, where the set of documents resulting from a query is presented as a multi-dimensional graph, the axes of the graph representing the relevancy of the documents to query elements—topics and terms. The user may perform searches on the graphically presented data or manipulate this data in a graphical manner. The present invention facilitates such searching, as since the metadata and query results are stored and manipulated by the local client processor 300, there is no communication overhead in obtaining the data to be presented in a graphical format.

4. Filtering the Metadata

An exemplary embodiment of the present invention supports filtering of the metadata prior to supplementing the metadata and searching. The metadata may be filtered at the server processor, the client processor or at another processor. The metadata is filtered based on a filtering query provided by the user or based on a pre-determined filtering query. The filtering query is of the same type and form as the user query described above for searching on the metadata. Filtering allows a smaller, more manageable and more focused set of metadata to be searched by the user, and when performed at a site remote from the client processor, filtering further reduces the amount of metadata that is transmitted to and stored by the client processor.

Figure 12:
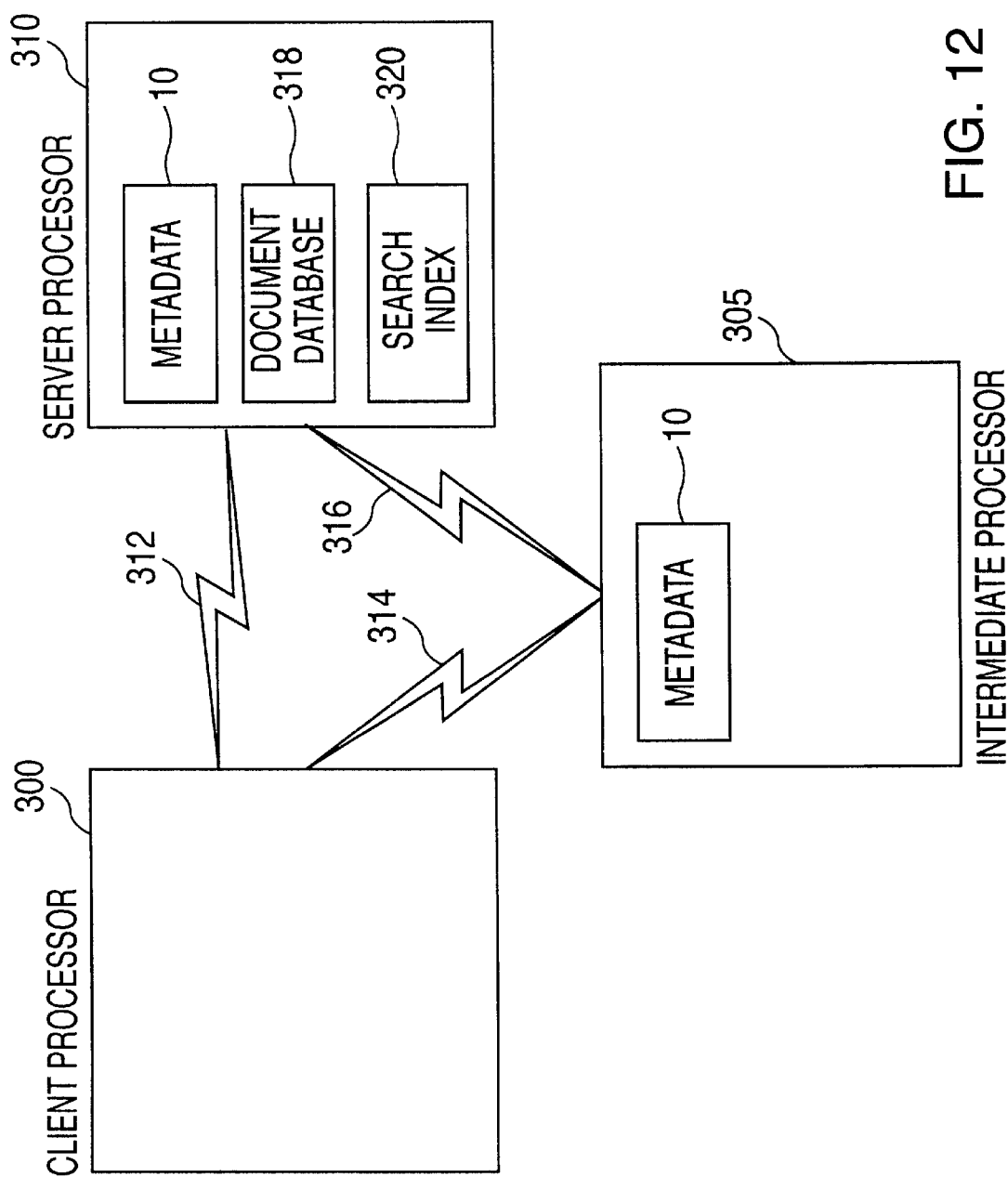
FIG. 12 is a block diagram illustrating a computer system according to an exemplary embodiment of the present invention.

FIG. 12 is a block diagram illustrating a computer system according to an exemplary embodiment of the present invention. Server processor 310 of FIG. 12 holds document database 318, for storing documents to be searched, compact integrated metadata 10, for distribution to client processor 300, and document search index 320, for conducting searches. In an exemplary embodiment document search index 320 is an FTI index. Intermediate processor 305 may be used to filter and distribute compact integrated metadata 10, and thus stores metadata 10. Client processor 300 accepts filtering queries, transmits filtering queries to server processor 310 and intermediate processor 305, and searches on filtered metadata. Client processor 300 and server processor 310 communicate via communications link 312. Client processor 300 and intermediate processor 305 communicate via communications link 314. Intermediate processor 305 and server processor 310 communicate via communications link 314.

Figure 13:
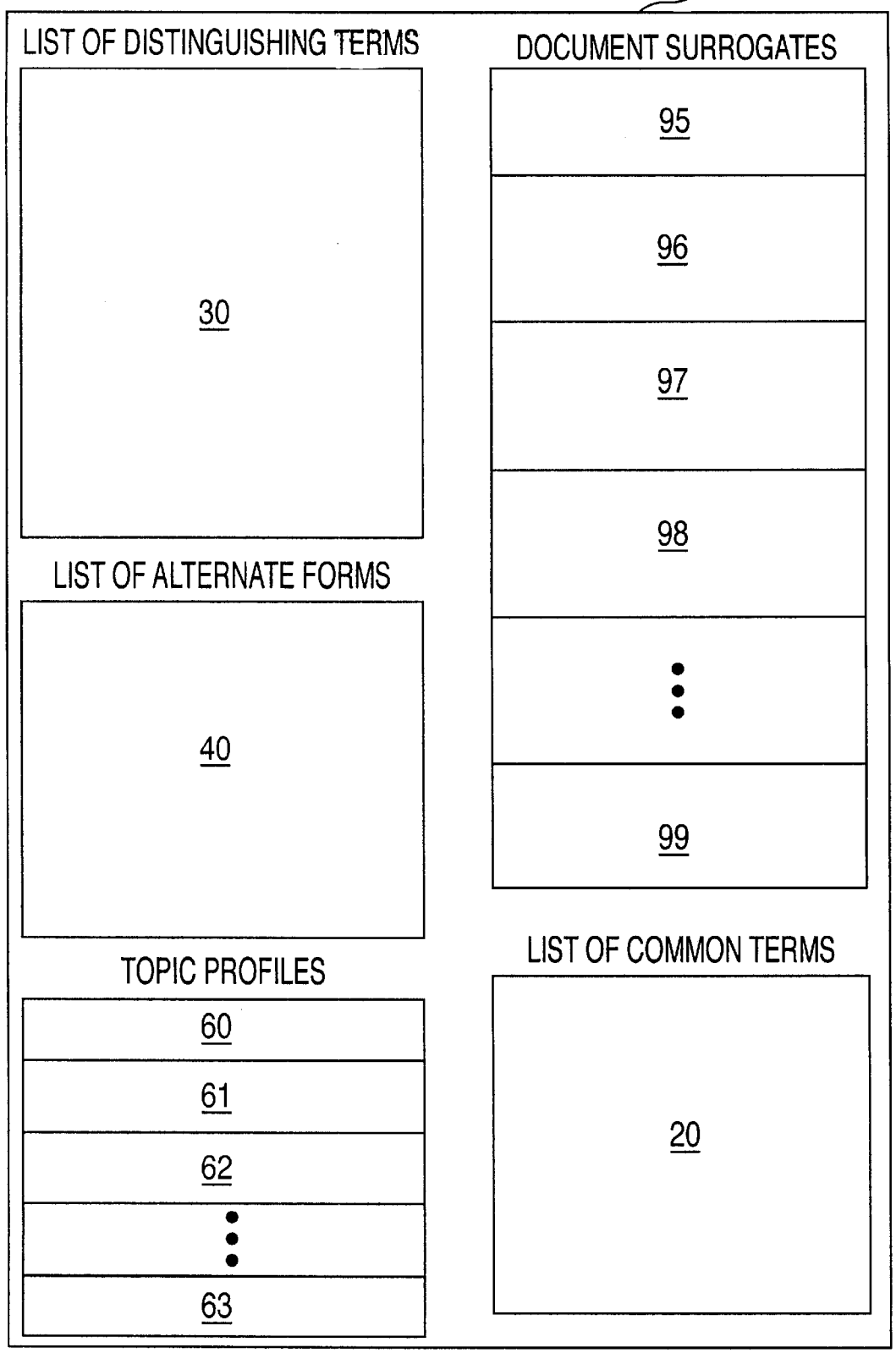
FIG. 13 is a block diagram illustrating the filtered metadata according to an embodiment of the present invention.

FIG. 13 is a block diagram illustrating the filtered metadata 11 according to an embodiment of the present invention. In an exemplary embodiment of the present invention the filtered metadata 11 comprises a list of common terms 20, a list of distinguishing terms 30, a list of alternate forms 40, and a set of topic profiles 60–63. Filtered metadata 11 further comprises a reduced set of document surrogates 95–99. The filtered metadata 11 is substantially similar to the metadata 10, except that a subset of the document surrogates 90–94 exists in the filtered metadata 11 as the reduced set of document surrogates 95–99. The reduction of the number of document surrogates may allow filtered metadata 11 to be of a significantly smaller size than metadata 10. The bulk of the metadata 10 is comprised of document surrogates 90–94.

Figure 14:
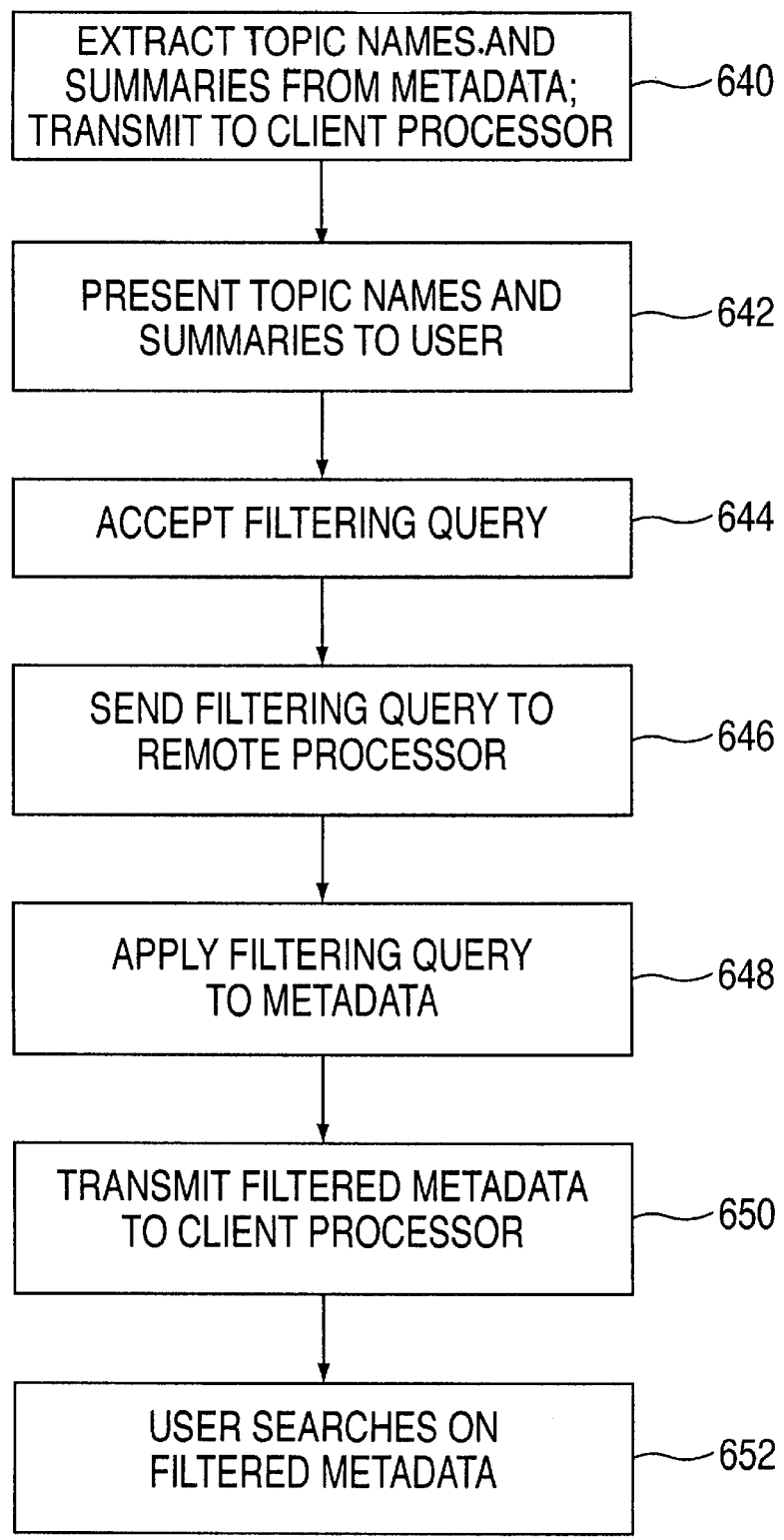
FIG. 14 is a flow chart illustrating the operation of the method for filtering the compact integrated metadata of FIG. 1 to produce filtered the metadata of FIG. 13 according to an embodiment of the present invention.

FIG. 14 is a flow chart illustrating the operation of the method for filtering the compact integrated metadata 10 of FIG. 1 to produce filtered metadata 11 of FIG. 13 according to an embodiment of the present invention.

Referring to FIG. 14, in step 640, a remote processor (server processor 310 or intermediate processor 305) extracts the topic names and summaries from the topic profiles 60–63 included in the metadata 10 and transmits the topic names and summaries to client processor 300. In an exemplary embodiment of the present invention, topic profiles 60–63 include topic summaries, brief descriptions of the topic, as well as a topic name. The topic names and summaries typically constitute under 1% of the total size of the metadata. A user may need information on topics to create a filtering query, but does not need to know term information contained in metadata 10. In alternate embodiments, the remote processor transmits information other than topic names and summaries; for instance, only the topic names may be sent to client processor 300.

In step 642, the topic names and summaries are presented to a user at client processor 300.

In step 644, the user enters a filtering query at client processor 300, similar to the query used to search the supplemented metadata 10' described above, constituting topics and terms, connected by connectors. At this stage client processor 300 does not need to have document surrogates 90–94 or the lists of common terms 20, distinguishing terms 30 and alternate forms 40, as the filtering query is evaluated at the remote processor. In an alternate embodiment, the filtering query may be of a form different than that used to search on the supplemented metadata 10' described above.

In step 646, the filtering query is sent to the remote processor. Other embodiments may create the filtering query at the remote processor, or may use pre-defined filtering queries.

In step 648, the remote processor applies the filtering query to the metadata 10 as described above and creates filtered metadata 11. As described above with respect to searching by client processor 300, the remote processor may supplement metadata 10 prior to applying the filtering query to the metadata. The application of the filtering query to the supplemented metadata 10' produces a set of document surrogates corresponding to the user query.

In an exemplary embodiment of the present invention, the filtered metadata 11 is identical to the original metadata 10, except that the set of document surrogates 90–94 is reduced according to the user query, and the user query is added to the filtered metadata 11. This reduced set of filtered metadata 11 may be more focused with respect to the interests or purposes of the user and is more easily transmitted to and stored by client processor 300. The filtered metadata 11 comprises topic profiles 60–63, the list of common terms 20, the list of distinguishing terms 30 and the list of alternate forms 40 from the original set of metadata 10. Filtered metadata 11 includes the filtering query which was used to create the set of filtered metadata and a reduced set of document surrogates 95–99, which is the set of document surrogates corresponding to the filtering query.

The filtering query added to the filtered metadata 11 is useful for describing the source or history of the filtered metadata. The list of common terms 20, the list of distinguishing terms 30 and the list of alternate forms 40 are not typically reduced, because these lists are equally applicable to the original set of document surrogates 90–94 and to the filtered set of document surrogates. Furthermore, the bulk of the metadata is comprised of the document surrogates, so reducing the size of the lists of terms does not reduce the size of the metadata by a significant amount. Reducing the number of document surrogates does reduce the size of the metadata by a significant amount.

In step 650, a set of filtered metadata 11 produced by the remote processor is provided to client processor 300.

In step 652, the user searches on the filtered metadata 11 at client processor 300, as described above. The user is able to search on a smaller and more focused set of metadata. Transmission, storage and manipulation of the smaller set of filtered metadata 11 is much easier than with the full metadata 10.

In an alternate embodiment, the metadata 10 may be filtered at client processor 300 in order to focus the area in which the user searches and to further reduce the amount of metadata stored at client processor 300. In such an embodiment, the entire set of metadata 10 is transmitted to client processor 300 as described above, and client processor 300 supplements the metadata as described above to produce supplemented metadata. The user enters a filtering query. Client processor 300 applies the filtering query to the metadata 10 to produce a set of filtered metadata 11. At this point the user may search the filtered metadata, as described above.

In an alternate embodiment the metadata 10 may be filtered by a pre-set query which is chosen by the user or for the user based on a user ID or account number. For instance, if the metadata concerns magazine articles of general subject matter, the user might select from a set of pre-defined filtering queries describing areas of interest. The pre-defined queries return filtered metadata where the documents in the filtered metadata correspond to the subject matter of the query. In an alternate embodiment client processor 300 need not transmit the filtering query to the remote processor; for example, the filtering query may already exist on the remote processor. In addition, the remote processor need not transmit the filtered metadata to client processor 300; for example, the filtered metadata may be distributed by CD-ROM or other media.

5. Integrating Searching at the Client and Server

In an exemplary embodiment the method and system of the present invention allow for searching on a client processor to be combined with searching on a server processor. In such an embodiment information from each search is stored on a client processor to allow for a more effective search process. A set of search domains, sets of references to documents over which the user searches, are stored. Using conventional IR techniques, a user cannot adjusts the search domain at the client level. The user often enters an entirely new search for every iteration, replicating part of a query from a previous search. Storing the state of a user search eliminates this problem. Storing the state of the search (the search domain and other information) on a client processor eliminates the need for a server processor to maintain search process states for the numerous users serviced by the server processor.

Furthermore, storing the state of the search allows a user to more manageably use strong terms and weak terms to search. Strong terms are those that are effective at distinguishing one topic from another. Weak terms are not as effective at distinguishing among topics, possibly because they have meaning in other topic areas. However, weak terms may be effective at searching within a set of documents relevant to a topic. Using an embodiment of the present invention, a user may create a search using strong terms, save the search domain, and then refine the search using weak terms. Searching first with strong terms then with weak terms is more difficult and time consuming if a user is not able to save and reuse the search state.

Integrating a client processor based search and a server processor based search has advantages over using only one search method—the benefits of each type of search may be combined. The client based search method described above, using compact integrated metadata, uses less resources and may be quicker than an FTI search. However, such a search uses metadata with a reduced information content; thus it may be desirable to use the search capabilities of a server processor. A server processor may have available an FTI or other type of index comprising more information than the compact metadata used by the client processor. In a client processor search, it may be the case that the document set returned by a query is small enough that the user may access each document from the server individually. However, it may be the case that the metadata search method described above merely reduces the size of the document search set to a manageable level, and the user then may desire an FTI search using a server processor.

FTI search methods are well known. An embodiment of the present invention provides a more efficient method of search, by allowing a server processor based search to be combined with a search using compact integrated metadata on a client processor and by maintaining a search process state on the client processor to aid the search.

Figure 15:
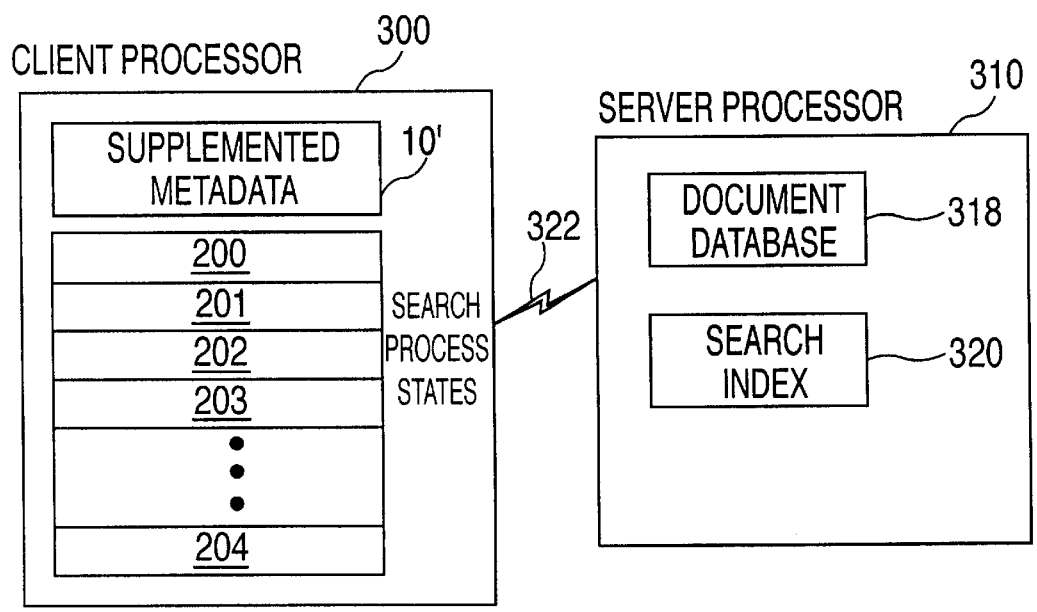
FIG. 15 is a block diagram illustrating a computer system according to an exemplary embodiment of the present invention.

FIG. 15 is a block diagram illustrating a computer system according to an exemplary embodiment of the present invention. Server processor 310 of FIG. 15 includes document database 318, for storing documents to be searched and document search index 320, for conducting searches at server processor 310. In an exemplary embodiment document search index 320 is an FTI index. Client processor 300 of FIG. 15 includes supplemented compact integrated metadata 10', for conducting searches at client processor 300 over documents in document database 318 and a set of search process states 200–204, for maintaining a record of a user's search. Communications link 322 allows client processor 300 and server processor 310 to communicate.

FIG. 16 is a block diagram illustrating search process state 200 of FIG. 15 according to an embodiment of the present invention. Search process state 200 comprises search domain 210 and a set of search filters 220. In an exemplary embodiment of the present invention search domain 210 is a list of references 212–15 to document surrogates contained in the supplemented metadata 10' and metadata 10. These documents comprise the set of the documents to be searched, and may be the entire set of documents represented by the metadata or a subset of the documents. Search filters 220 are queries in the query language of either client processor 300 or server processor 310 and are applied to the search domain to provide a smaller, more focused set of documents. If search domain 210 is the original set of compact integrated metadata 10 provided to client processor 300, the set of search filters 220 may be empty, as no search has yet been performed. In alternate embodiments search domain 210 may be a set of actual document surrogates, document titles, web site addresses, or any information used to specify documents or files.

Figure 17:
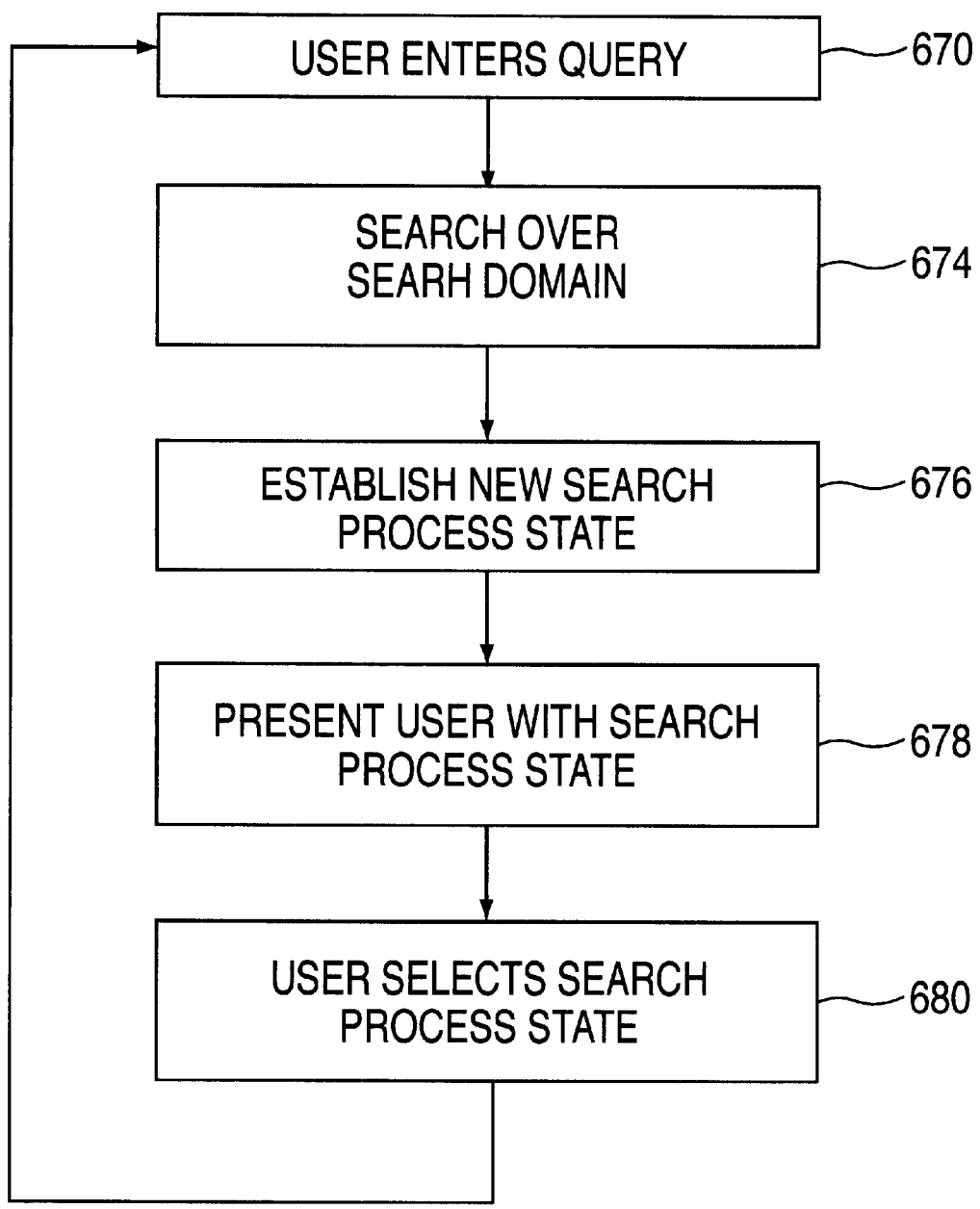
FIG. 17 is a flow chart illustrating the operation of the method for integrating a search at a client processor and a server processor according to an embodiment of the present invention.

FIG. 17 is a flow chart illustrating the operation of the method for integrating a search at client processor 300 and server processor 310 according to an embodiment of the present invention.

Referring to FIG. 17, in step 670, the user enters a query at a client processor. This query is either a query to be used by client processor 300 to search the supplemented metadata 10', described above, or a query in the form acceptable by server processor 310, which will conduct an FTI search. An FTI query consists of terms and other document information, such as document date or author, and connectors and modifiers. Methods of constructing such searches are well known. Other embodiments do not require that each processor have a particular search method; for instance, server processor 310 may utilize both an FTI search method and one using topic profiles.

A sample FTI search asking for all documents published after January, 1997, containing the root "legal" completed in any form and authored by "John Smith" may be written:

after(January 1997) and legal! and author("John Smith").

In step 674, a search is performed on either the client processor 300 or server processor 310 over the current search domain using the query. The current search domain is the set of documents over which the user searches. The user may have chosen the current search domain to be a set of references to a subset of the set of documents in metadata 10. If no queries have yet been performed the current search domain may include the entire set of documents in metadata 10.

If the query is to be used by client processor 300, client processor 300 searches the supplemented metadata 10', as described above. However, the search is conduced on the restricted set of documents defined by the current search domain. The resulting set of documents forms a new search domain. If the query is to be used by server processor 310, client processor 300 sends to server processor 310 the current search domain and the query. Server processor 310 searches document database 318 using document search index 320, and returns to client processor 300 a set of references to documents that correspond to the query, a subset of the current search domain.

In step 676, client processor 300 establishes as a new search process state the new search domain (the set of references to documents returned from the search conducted in step 674), the filters associated with the prior search state, and the new filter, which is the query used to form the search. Thus a search process state includes all filters that resulted in the set of documents included in the search domain. The filters are used as a description of the search domain—a user may refer to the filters to determine how the search domain was created. The new search process state is added to the set of existing search process states (if any exist). In this manner a set of search process states are created.

In step 678, a user is presented with the set of search process states. One of these search process states, the initial search process state, contains the search domain as initially presented to the user and has no associated search filter.

In step 680, the user selects one of the previously created search process states on which to conduct a query.

Client processor 300 proceeds to step 670, where the user creates a query and searches at client processor 300 or server processor 310.

In alternate embodiments filters included in the search process state may be generated automatically for a particular user, and may be transparent to the user. In other embodiments the search process state is created, maintained, and used on one processor. Other embodiments may allow for the search process state to be maintained on one processor but searched over using another processor instead of using both processors.

V. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention.

In alternate embodiments the metadata may be of any structure allowing for a resource efficient search, or a search over more than one filtering criterion. The specific structures described above—the document surrogates, topic profiles, and lists, need not be used. The specific methods of creating and supplementing metadata and of searching need not be used. For instance, using inverted topic and term lists, zoned term lists, and weights is not required.

The method of the present invention does not require compound terms or alternate forms. In other embodiments, alternate forms and compound terms may be defined in data structures other than those described herein. The metadata may use a reduced text index of a different type than that described herein. Topics may be defined in a manner different than that described above. In other embodiments, the weight attached to each profile term in a topic profile may allow for a more complex evaluation. The topic profiles may be created in a hierarchy of topics and sub-topics.

In addition, alternate embodiments may incorporate other features, such as allowing weights or other modifying information to modify query terms and topics. For example, a user may indicate that a topic or term is either necessary or sufficient. The queries and filtering queries described above need not take any particular form.

The metadata may be distributed on a storage device such as a floppy disk or CD-ROM, instead of being transmitted via a communications link.

Other embodiments may use different methods for inverting the list of distinguishing terms, creating the topic index, and determining the relevancy of a topic to a document. In other embodiments the metadata may be supplemented by the processor creating metadata.

Other embodiments do not require that each processor in the distributed architecture described use a particular search method. The creating and supplementing of the metadata, the searching and the filtering may be performed at a client processor, a server processor or an intermediate processor. Other embodiments may create the filtering query at the remote processor, or may use pre-defined filtering queries. In alternate embodiments filters included in a search process state may be generated automatically for a particular user, and may be transparent to the user. The search process state need not be of the particular structure defined herein.

What is claimed is:

1. A method for searching a set of documents using metadata, the method comprising:

providing a set of documents, each document including a set of terms;

providing metadata including a set of topic profiles, a set of distinguishing terms and a set of document surrogates, each document surrogate including a reduced representation of a document in said set of documents;

for each topic profile creating a set of topic references, each topic reference referring to a document surrogate;

accepting a query; and searching said set of documents based on said metadata.

2. The method of claim 1, further comprising the step of for each term in the set of distinguishing terms creating a set of term references, each term reference referring to a document surrogate.

3. The method of claim 1, each topic profile corresponding to a topic, each topic having a title, where the query comprises at least one of a set of terms and a set of topic titles.

4. The method of claim 1, further comprising the step of applying each topic profile to each document surrogate to return a measure of relevancy.

5. The method of claim 2, further comprising the step of applying each topic profile to each document surrogate to return a measure of relevancy.

6. The method of claim 2, where the set of distinguishing terms has a size limit, the size limit being set before the set of distinguishing terms is created.

7. The method of claim 5, further comprising the step of returning a set of references to documents corresponding to the query.

8. A method for searching a set of documents using integrated data, the method comprising:

providing a set of documents using, each document including a set of terms;

providing integrated metadata including a first set of search items and a second set of search items, the first set of search items relating to the terms included in each document in the set of documents and the second set of search items relating to the topic of each document in the set of documents;

for each item in the first set of search items, creating a set of references, each reference referring to a document in the set of documents;

for each item in the second set of search items, creating a set of references, each reference referring to a document in the set of documents;

accepting a query; and searching said set of documents based on said integrated metadata.

9. The method of claim 8, further comprising the step of returning a set of query references to documents corresponding to the query.

10. The method of claim 9, where the first set of search items has a size limit, the size limit being set before the set of search items is created.

11. A method for searching a set of documents using meadata, the method comprising:

providing a set of documents, each document including a set of terms;

providing metadata including a set of topic profiles;

for each topic profile creating a set of topic references, each topic reference referring to a document;

accepting a query; and searching said set of documents based on said metadata.

12. The method of claim 11, further comprising the step of accepting a query.

13. The method of claim 11, further comprising the step of applying each topic profile to each document to return a measure of relevancy.

14. The method according to claim 11, further comprising:
accepting a filtering query;
applying the filtering query to the metadata to generate a subset of the metadata; and
creating filtered metadata by combining the subset of the metadata and the filtering query.

15. The method according to claim 14 where:
the step of accepting the filtering query comprises the step of accepting the filtering query at a first processor; and
the step of applying the filtering query comprises the step of applying the filtering query at a second processor.

16. The method of claim 15 further comprising the step of accepting a search query at the first processor.

17. The method of claim 16 further comprising the step of applying the search query at the first processor.

18. A method of creating filtered metadata from a set of metadata, comprising:
accepting a filtering query;
applying the filtering query to the metadata, to create filtered metadata, at a first processor;
searching the filtered metadata at a second processor;
accepting a search query; and
searching a set of documents based on said metadata.

19. The method of claim 18 further comprising the step of accepting a search query.

20. The method of claim 19 where the step of applying the filtering query comprises the step of applying the filtering query at a first processor, the method further comprising the step of searching the filtered metadata at a second processor.

21. The method of claim 18 where the step of applying the filtering query comprises the step of applying the filtering query at a first processor and where the step of searching the filtered metadata comprises the step of searching the filtered metadata at a second processor.

22. A method of searching a set of documents, comprising:
providing a set of documents;
maintaining on a client processor an at least one search domain, the at least one search domain including a set of references to documents and a set of previous search queries;
accepting a search query;
searching said set of documents base on said search domain; and
querying a server processor with the at least one search domain and the search query.

23. The method of claim 22 further comprising:
at the server processor, applying the search query to the search domain to produce a search result;
transmitting the search result from the server processor to the client processor; and
at the client processor, creating an updated search domain, the updated search domain comprising the search result and the search query.

24. The method of claim 22 further comprising:
after the query is accepted, producing a set of query references to returned documents corresponding to the query;
creating a search domain, the search domain comprising the set of query references and the query.

25. A method for searching a set of documents, the method comprising:
providing a set of documents, each document including a set of terms;
maintaining a set of search states, each search state comprising a set of references to at least a subset of the set of documents;
allowing a user to select a current search state from the set of search states;
accepting a user query; and
searching the documents corresponding to the set of references contained in the current search state using the user query.

26. A system for searching a set of documents using metadata, the system comprising:
providing a set of documents, each document including a set of terms;
providing metadata including a set of topic profiles, a set of distinguishing terms and a set of document surrogates, each document surrogate including a reduced representation of a document in said set of documents;
a profile module for creating for each topic profile a set of topic references, each topic reference referring to a document surrogate; and
a query module for accepting a query.

27. The system of claim 26, further comprising a term reference module for creating for each term in the set of distinguishing terms a set of term references, each term reference referring to a document surrogate.

28. The system of claim 27, each topic profile corresponding to a topic, each topic having a title, where the query comprises at least one of a set of terms and a set of topic titles.

29. A program storage device readable by a computer system, for storing a plurality of instructions for searching a set of documents using metadata, the plurality of instructions comprising:
providing a set of documents, each document including a set of terms;
providing meadata including a set of topic profiles, a set of distinguishing terms and a set of document surrogates, each document surrogate including a reduced representation of a document in said set of documents;
instructions for creating a set of topic references for each topic profile, each topic reference referring to a document surrogate; and
instructions for accepting a query.

30. The program storage device of claim 29, comprising further instructions for creating a set of term references for each term in the set of distinguishing terms, each term reference referring to a document surrogate.

31. The program storage device of claim 30, where each topic profile corresponds to a topic, each topic has a title, and the query comprises at least one of a set of terms and a set of topic titles.

32. A system for creating and searching filtered metadata from a set of metadata, the system comprising:
a filtering query input module located at a first processor for accepting a filtering query;
a filtering query application module located at a second processor for applying the filtering query to the metadata to create filtered metadata at said first processor;

a search query input module located at the first processor for accepting a search query; and a search module located at the first processor for searching the filtered metadata using the search query.

33. A program storage device readable by a computer system, for storing a plurality of instructions for creating and searching filtered metadata from a set of metadata, comprising:

instructions for accepting a filtering query;

instructions for applying the filtering query to the metadata to create filtered metadata at a first processor;

instructions for accepting a search query; and instructions for searching the filtered metadata at a second processor using the search query.

34. A system for searching a set of documents, the system comprising:

providing a set of documents, each document including a set of terms;

a client processor maintaining an at least one search domain, the at least one search domain comprising a set of references to documents and a set of previous search queries;

the client processor accepting a search query; and the client processor querying a server processor with the at least one search domain and the search query.

35. A program storage device readable by a computer system, for storing a plurality of instructions for searching a set of documents, comprising:

instructions for maintaining on a client processor an at least one search domain, the at least one search domain including a set of references to documents and a set of previous search queries;

instructions for accepting a search query;

instructions for searching said set of documents based on said search domain;

instructions for querying a server processor with the at least one search domain and the search query.

* * * * *

UNITED STATES PATENT AND TRADEMARK OFFICE
CERTIFICATE OF CORRECTION

PATENT NO.     : 6,480,835 B1
DATED          : November 12, 2002
INVENTOR(S)    : John Light It is certified that error appears in the above-identified patent and that said Letters Patent is hereby corrected as shown below:

Column 24,
Line 60, "...meadata" should be -- ...metadata --

Column 25,
Line 51, "...base" should be -- ...based --

Column 26,
Line 44, "...meadata" should be -- ...metadata --

Signed and Sealed this

Seventh Day of October, 2003

JAMES E. ROGAN
*Director of the United States Patent and Trademark Office*